United States Patent
Shiota et al.

(10) Patent No.: US 6,797,184 B2
(45) Date of Patent: Sep. 28, 2004

(54) CATALYST FOR TREATING WASTE WATER, METHOD FOR PREPARING THE SAME AND PROCESS FOR TREATING WASTE WATER

(75) Inventors: Yusuke Shiota, Himeji (JP); Kuninori Miyazaki, Himeji (JP); Takaaki Hashimoto, Himeji (JP); Tohru Ishii, Hyogo-ken (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/615,852

(22) Filed: Jul. 10, 2003

(65) Prior Publication Data

US 2004/0104181 A1 Jun. 3, 2004

Related U.S. Application Data

(62) Division of application No. 09/753,682, filed on Jan. 4, 2001, now abandoned.

(30) Foreign Application Priority Data

| Jan. 5, 2000 | (JP) | 2000-5198 |
| Apr. 4, 2000 | (JP) | 2000-102629 |
| Apr. 14, 2000 | (JP) | 2000-114130 |
| Apr. 14, 2000 | (JP) | 2000-114131 |

(51) Int. Cl.$^7$ ................................................. C02F 1/72
(52) U.S. Cl. ..................... 210/762; 210/763; 502/23; 502/25; 502/29; 502/183; 502/184; 502/185
(58) Field of Search .................... 210/762, 763, 210/766, 739, 742; 502/22, 23, 25, 29, 182–185

(56) References Cited

U.S. PATENT DOCUMENTS

| 4,361,500 A | 11/1982 | Mathe et al. ............... 252/430 |
| 4,683,065 A | 7/1987 | Sheikh ....................... 210/668 |
| 4,699,720 A | * 10/1987 | Harada et al. ............. 210/762 |
| 4,751,005 A | * 6/1988 | Mitsui et al. .............. 210/759 |
| 5,110,779 A | 5/1992 | Hucul ......................... 502/185 |
| 5,149,680 A | 9/1992 | Kitson et al. |
| 5,214,014 A | 5/1993 | Yoshimoto et al. |
| 5,232,604 A | * 8/1993 | Swallow et al. ............ 210/759 |
| 5,362,405 A | 11/1994 | Birbara et al. ............. 210/763 |

(List continued on next page.)

FOREIGN PATENT DOCUMENTS

| EP | 0 330 627 | 8/1989 |
| EP | 0 399 302 | 11/1990 |
| EP | 0 514 177 | 11/1992 |
| EP | 0 913 193 | 5/1999 |
| GB | 2 043 045 | 10/1980 |
| JP | 58114733 | * 8/1983 |
| JP | 4-45214 | 7/1992 |
| JP | 4-300696 | 10/1992 |
| JP | 6-47101 | 2/1994 |
| JP | 9-10602 | 1/1997 |
| JP | 9-155364 | 6/1997 |
| JP | 9-253669 | 9/1997 |
| JP | 9-253696 | 9/1997 |

Primary Examiner—Peter A. Hruskoci
(74) Attorney, Agent, or Firm—Wenderoth, Lind & Ponack, L.L.P.

(57) ABSTRACT

A method is provided for oxidizing and/or decomposing organic and/or inorganic oxidizable substances in waste water by wet oxidation with a use of a catalyst, wherein the oxidizable substances are oxidized and/or decomposed with an oxygen containing gas in the presence of the catalyst under pressure such that the waste water retains the liquid phase thereof at a temperature of 50° C. to less than 170°C.; the catalyst contains activated carbon; and the oxygen concentration is controlled in an exhaust gas in the range from 0 to 5 vol %. The present inventive method is capable of treating waste water efficiently for a long period in a stable manner at reduced temperatures as compared with the substantially higher temperatures and pressures used in many of the prior art methods.

15 Claims, 4 Drawing Sheets

U.S. PATENT DOCUMENTS

| | | | |
|---|---|---|---|
| 5,552,063 A | 9/1996 | Yan | 210/763 |
| 5,620,610 A | 4/1997 | Ishii et al. | |
| 5,674,382 A * | 10/1997 | Chapman | 210/96.1 |
| 5,720,889 A * | 2/1998 | McBrayer et al. | 210/739 |
| 5,770,093 A | 6/1998 | Shiota et al. | 210/762 |
| 6,051,198 A | 4/2000 | Sano et al. | |
| 6,149,820 A | 11/2000 | Pedersen | |
| 6,159,896 A | 12/2000 | Zoeller et al. | |
| 6,168,775 B1 | 1/2001 | Zhou et al. | |
| 6,632,973 B1 * | 10/2003 | Miyake et al. | 588/205 |

* cited by examiner

CATALYST FOR TREATING WASTE WATER, METHOD FOR PREPARING THE SAME AND PROCESS FOR TREATING WASTE WATER

This application is a divisional of application Ser. No. 09/753,682 filed Jan. 4, 2001, now abandoned.

BACKGROUND OF THE INVENTION

1. Field of the Invention

This invention relates to a process for treating waste water containing organic and/or inorganic oxidizable substances by wet oxidation with a use of a catalyst performed in the presence of an oxygen-containing gas, and more particularly pertains to a process for treating waste water efficiently for a long period in a stable manner by using a solid catalyst containing activated carbon and by regulating the oxygen concentration in an exhaust gas.

This invention further relates to a process for suppressing deterioration of the catalytic activity of the solid catalyst at the time of temperature rising when starting up a operation of the wet oxidation and/or at the time of temperature lowering when suspending the operation by protecting the catalyst according to needs, or to a process for efficiently recovering the degraded catalytic activity of the solid catalyst containing activated carbon according to needs.

2. Description of the Related Art

Heretofore, there have been known, for example, biological treatment and wet oxidation treatment, as means for purifying waste water containing organic or inorganic oxidizable substances. Biological treatment has a disadvantage in consuming a long time to decompose the oxidizable substances in the waste water. Further, this treatment is limited to treat waste water of a low concentration. In the case where the waste water is of high concentration, it is required for diluting the waste water to a proper concentration. The method demands a large space for the installation of facilities for diluting waste water. Further, microorganisms that are used in the biological treatment are susceptible to change of the environment such as temperature. These factors make it difficult to stably operate the waste water treatment for a long time.

Wet oxidation is a process for treating waste water in the presence of oxygen at a high temperature under high pressure to oxidize and/or decompose oxidizable substances in the waste water. As an example of this process, there has been proposed a wet oxidation using a solid catalyst (herein after may be referred to as "catalytic wet oxidation") as a means for speeding up the reaction rate and loosening the requirements for reaction (reaction condition). In the catalytic wet oxidation, a catalyst using an oxide, and a catalyst using combination of such an oxide and a precious metal element are employed.

In the aforementioned wet oxidation process, it has been required to treat waste water at a temperature of 170° C. or more in order to oxidize and/or decompose various oxidizable substances in the waste water. It is often the case that a pressure as large as 1 MPa (Gauge) or more is required. For example, Japanese Unexamined Patent Publication No. 11-347574 proposes a technique in which a catalyst comprising platinum supported on titania is used and acetic acid is subjected to wet oxidation at 170° C. This technique still requires a treating condition of setting the temperature at a relatively high degree. Therefore, there has been a demand for developing a technique of treating waste water at a low temperature and low pressure and with a high treating performance.

In view of the above problems residing in the prior art, the inventors of this invention has been developing a new catalyst and researching a new waste water treating process. As a result of trials and errors, the inventors found that a solid catalyst containing activated carbon exhibits significantly high catalytic activity to organic and/or inorganic oxidizable substances under a temperature lower than 170° C. and a low pressure. Such a low temperature and low pressure condition contributes to loosening the requirements for reaction.

In the case where a solid type catalyst containing activated carbon is used, there has to be considered various problems as follows. Activated carbon is liable to be brought into combustion under the conventional wet oxidation. Therefore, it has been impossible to utilize activated carbon as a catalytic component for wet oxidation. Specifically, in the case where a catalyst containing activated carbon is employed, it is often the case that the catalyst does not have heat resistance of resisting a high temperature such as 170° C. or more. Even if the catalyst exhibits a high catalytic activity at an initial stage of reaction, the catalytic activity deteriorates rapidly within 100 hours or less. Therefore, utilization of the catalyst containing activated carbon has been practically impossible.

On the other hand, in the case where there is not provided sufficient measures for protecting the catalyst during its use even at a low temperature such as 170° C. or less, the activated carbon itself is subjected to combustion due to existence of oxygen containing gas. Consequently, the catalytic activity also deteriorates within a short period such as within one hundred to several hundreds hours. Thus, utilization of the activated-carbon-containing catalyst was impossible in the conventional wet oxidation for treating waste water.

Japanese Unexamined Patent Publication No. 11-179378 discloses a technique of oxidizing an oxygen-containing organic compound having solely one carbon atom per molecule at a temperature of 100° C. or lower with use of a catalyst in which a precious metal is supported on activated carbon. This technique is not applicable to treating an organic compound having two or more carbon atoms per molecule or inorganic compound. Also, this publication does not fully consider durability (heat resistance) of the catalyst in which a precious metal is supported on activated carbon.

The above problems such as a possibility of combustion of activated carbon itself and deterioration of catalytic activity were also observed when treating waste water containing organic and/or inorganic oxidizable substances at the time of temperature rising by starting up the operation of the wet oxidation apparatus and/or at the time of temperature lowering by suspending the operation if the treatment is performed under the same oxidization atmosphere as in the conventional system.

It is often the case that raising the pressure in the apparatus is required so that the waste water retains its liquid phase while raising the temperature of the waste water in the wet oxidation. Therefore, it is a general practice to supply oxygen-containing gas even in the absence of oxidizable substances in order to maintain the pressure in the apparatus to a certain level at the time of starting-up the apparatus. As a result, it is likely that the catalytic activity of the catalyst containing activated carbon is deteriorated at the time of starting up the operation of the apparatus prior to actual treatment of waste water as well as during suspension of the operation of the apparatus, namely, suspension of supply of the waste water. In order to avoid such a problem, there has been proposed a technique of supplying gas which does not contain oxygen. e.g., nitrogen gas, into the apparatus during starting-up operation of the apparatus or suspension of the operation of the apparatus. This technique, however, is not desirable in the aspect of cost performance and necessity of cumbersome operation. There has also been a problem that the catalytic activity is lowered due to existence of oxygen that has remained in the apparatus or adsorbed to the catalyst even during non-supply period of oxygen-containing gas.

Japanese Unexamined Patent Publication No. 4-300696 discloses a technique of initiating an operation of the apparatus for catalytic wet oxidation. In this publication, disclosed is a technique of omitting or simplifying a device that is required for pre-heating of the apparatus during start-up operation, rapidly initiating oxidation, and treating waste water with high performance. This publication, however, does not propose a technique of suppressing deterioration of catalytic activity.

Maintenance of high catalytic activity for a longer period and carrying out the waste water treatment with high performance have been strongly demanded recently. For instance, in the case where the waste water contains oxidizable substances which are hard to decompose, it is required to set the treating temperature at a relatively high level in order to accomplish waste water treatment with high performance. In such a case, durability of the activated-carbon-containing catalyst is liable to deteriorate.

Activated carbon has a property of absorbing oxidizable substances in the waste water. In the case where the decomposing rate of the oxidizable substances that have been adsorbed to the activated carbon is extremely slow, oxidation and decomposing ability of the catalyst gradually decrease during waste water treatment. Further, in the case where waste water treatment is performed for a long period, a problem involved in waste water treatment such as disorder of the apparatus and erroneous operation of the apparatus cannot be avoided, which may deteriorate the catalytic activity of the activated-carbon-containing catalyst.

In view of the aforementioned various problems, there has been a demand for a technology of recovering the catalytic activity of the activated-carbon-containing catalyst that has been once deteriorated.

Several catalyst recovering techniques have been proposed heretofore. For example, Japanese Examined Patent Publication No. 3-66018 proposes a technique of combining (a) acid washing process and (b) liquid phase reduction process or combining (a) acid washing process and (c) gaseous phase reduction process. The acid washing is such that the catalyst is washed in an acidic aqueous solution containing at least one component selected from the group consisting of hydrochloric acid, nitric acid, phosphoric acid, acetic acid, and propionic acid. The liquid phase reduction is such that the catalyst is reduced with use of an aqueous solution containing at least one component selected from the group consisting of hydrazine hydrate, formaldehyde, sodium borohydride, lithium aluminohydride, sodium tartrate, glucose, potassium formate, and sodium formate. The gaseous phase reduction is such that the catalyst is reduced with use of a gaseous reducing agent containing hydrogen and/or carbon monoxide.

The above mentioned method, however, is not sufficient in recovering the catalytic activity of the activated-carbon-containing catalyst. Conversely, this process may likely to cause deterioration of catalytic activity. Further more the gaseous phase reduction employing hydrogen or carbon monoxide also has a problem because it is difficult to implement the reduction in a state that the catalyst is filled in a waste water treating apparatus as itself. To carry out the water treating process while employing the gaseous phase reduction, it is necessary to take out the catalyst from a reactor and install a furnace exclusively used for reduction and calcination. Such an arrangement, however, is practically unexecutable.

Japanese Examined Patent Publication No. 4-45214 proposes a technique of rendering the catalyst into contact with an aqueous solution containing formic acid and/or oxalic acid at a temperatures ranging from 40 to 85° C. and heating the catalyst to decompose the formic acid and/or oxalic acid, thereby reducing the catalyst. This recovering process, however, does not completely recover the catalytic activity of the activated-carbon-containing catalyst. Conversely, this recovering process may cause deterioration of the catalytic activity and corrosion of the parts constituting the apparatus.

Japanese Unexamined Patent Publication No. 9-10602 proposes a technique of contacting a solid catalyst whose catalytic activity has been deteriorated due to oxidation resulting from oversupply of oxygen, substantially without supply of oxygen, with a regenerated solution which contains at least one ammonium salt selected from the group consisting of ammonium sulfate, ammonium chloride, and ammonium carbonate, or which contains ammonia and at least one ammonium salt selected from the group consisting of ammonium sulfate, ammonium chloride, and ammonium carbonate and has pH from 3 to 10. This technique is effective to some extent in recovering the catalytic activity of the catalyst containing activated carbon. However, there is room for further developing the technique to achieve more improved recovering performance.

OBJECT OF THE INVENTION

The present invention has been accomplished to solve these problems. Accordingly, an object of the present invention is to provide a catalyst for oxidizing and/or decomposing organic and/or inorganic oxidizable substances in the waste water by catalytic wet oxidation efficiently in a stable manner and the preparation method thereof.

Another object of the present invention is to provide a method for treating waste water efficiently for a long period in a stable manner by wet oxidation using a catalyst containing activated carbon at low temperature and under low pressure.

Further object of the present invention is to provide a method for suppressing deterioration of the catalytic activity of the solid catalyst at the time of temperature rising when starting up the operation of the wet oxidation and/or at the time of temperature lowering when suspending the operation of the wet oxidation.

Still further object of the present invention is to provide a method for efficiently recovering the deteriorated catalytic activity of the catalyst containing activated carbon.

SUMMARY OF THE INVENTION

The object mentioned above is accomplished by a catalyst for the treatment of a waste water, which catalyst comprises activated carbon, (a) component (also referred to as "first component") and (b) component (also referred to as "second component").

(a) component is at least one selected from the group consisting of Ti, Zr, Hf, Nb, Ta, Fe, Co, Mn, Al, Si, Ga, Ge, Sc, Y, La, Ce, Pr, Mg, Ca, Sr, Ba, In, Sn, Sb and Bi.

(b) component is at least one selected from the group consisting of Pt, Pd, Rh, Ru, Ir and Au.

The present inventive catalyst can be prepared by a method for the production of the catalyst which method comprises the steps of depositing (a) component on the activated carbon and depositing (b) component on the activated carbon.

Another object of the present invention can be accomplished by a method for oxidizing and/or decomposing organic and/or inorganic oxidizable substances in waste water by wet oxidation with a use of a catalyst, wherein the oxidizable substances are oxidized and/or decomposed with an oxygen containing gas in the presence of the catalyst under pressure such that said waste water retains the liquid phase thereof at temperature of 50 to less than 170° C., the catalyst contains activated carbon and controlling an oxygen concentration in an exhaust gas in the range from 0 to 5 vol %.

Further object of the present invention can be accomplished by the method which is characterized in that a catalyst protection liquid which contains easily decomposable substances is supplied at the time of temperature rising when starting up a operation of the wet oxidation and/or at the time of temperature lowering when suspending the operation.

Still further object of the present invention is accomplished by the method which is characterized in that a catalyst recovering liquid which contains easily decomposable substances is supplied to the catalyst under temperatures in the range from 55° C. to less than 200° C.

DETAILED DESCRIPTION OF THE PREFERRED EMBODIMENTS OF THE INVENTION

Figure 1:
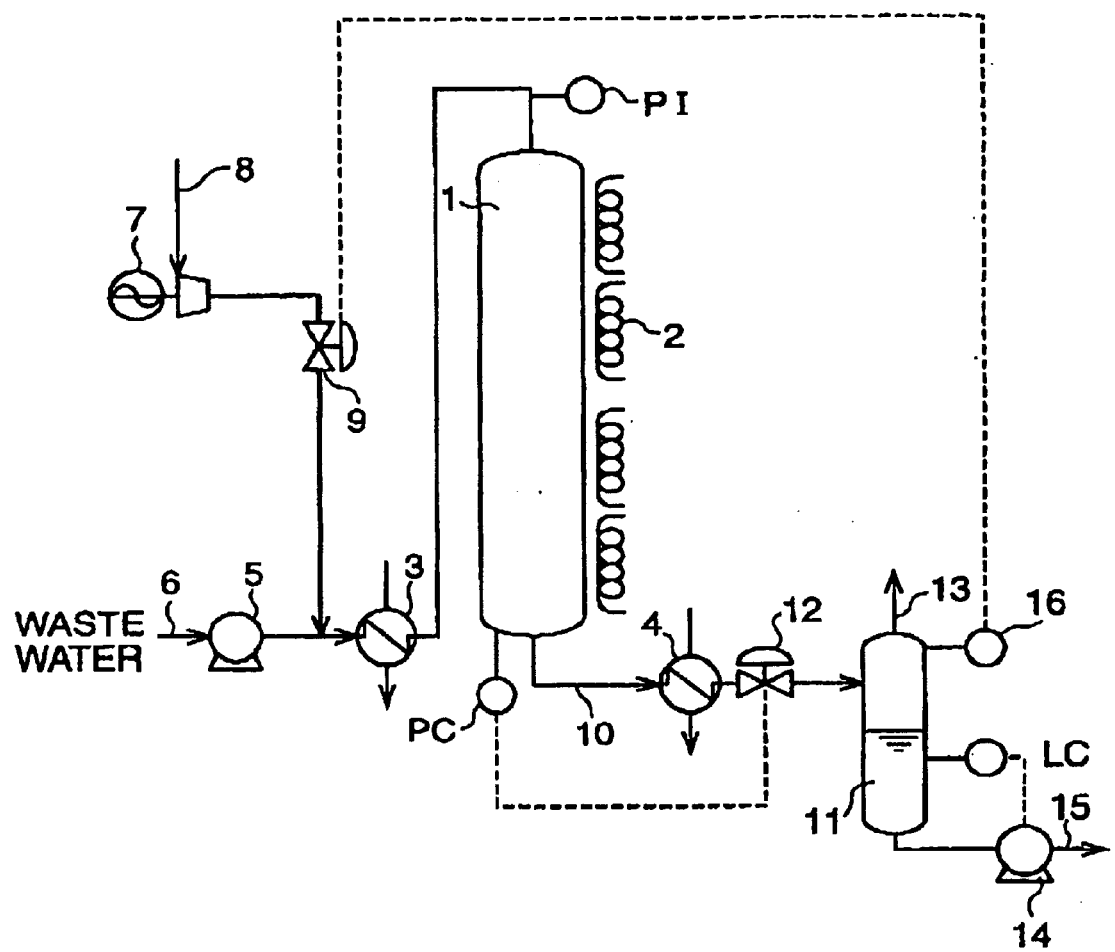
FIG. 1 is a schematic diagram of the system for use in the method of this invention.

As a result of various studies, the present inventors have found a method for oxidizing and/or decomposing oxidizable substances in waste water with high efficiency. Such a method comprises subjecting the waste water to wet oxidation treatment using the catalyst containing an activated carbon under such pressure as enables to waste water to retain the liquid phase thereof intact and at a temperature in the range from 50° C. to less than 170° C. while supplying an oxygen containing gas. And also present inventors have found a method for treating the oxidizable substances in the waste water stably by wet oxidation with suppressing a deterioration of the catalyst for a long period by controlling the oxygen concentration in a exhaust gas, which is emitted after treating the waste water, to a specified range.

Further more, the present inventors have found that (1) deterioration of the catalyst can be suppressed by supplying a catalyst protection liquid containing easily decomposable substances to a catalyst bed at the time of temperature rising when starting up a operation of the wet oxidation and/or at the time of temperature lowering when suspending the operation. Still further, (2) A catalyst containing activated carbon, which catalytic activity for oxidizing and/or decomposing oxidizable substances is deteriorated, can be recovered by operating the wet oxidation at a temperature in the range from 50° C. to less than 200° C. while supplying a catalyst recovering liquid containing easily decomposable substances to a catalyst bed.

According to the present invention, "oxidizable substances" means organic and/or inorganic compound which can be oxidized and/or decomposed by the wet oxidation process. Oxidizable substances includes, but not limited to, organic compounds including methanol, ethanol, acetaldehyde, formic acid, acetone, acetic acid, propionic acid, tetrahydrofuran (THF), and phenol; nitrogenous compounds including ammonia, hydrazine, nitrous acid ion, dimethylformamide (DMF), and pyridine; sulfuric compounds including thiosulfuric acid ion, sodium sulfide, dimethyl sulfoxide, alkyl benzene sodium sulfonate: organic halogenated compounds; and organic phosphorous compounds. These compounds may be suspended or dissolved in the waste water. A catalyst used in the present invention is a solid catalyst containing at least activated carbon as a carrier. A type of activated carbon for use in the present invention is not specifically limited. As a raw material of activated carbon, such as charcoal, coal, coke, peat, lignite and pitch are exemplified. Also carbon fiber type activated carbon such as activated carbon fiber of acrylonitrile family, phenol family, cellulose family, and pitch family can be used as a material of activated carbon.

The shape of solid catalyst is not specifically limited, and may be used as molded in various shapes such as, for example, spheres, grains, pellets, rings, shredding and monolithic structure such as honeycomb.

According to the present inventive method, depending on the types and concentration of oxidizable substances in the waste water, the catalyst consisting of activated carbon alone exhibits enough catalytic activity required for oxidizing/decomposing the oxidizable substances. The present inventive catalyst preferably contains at least one selected from (b) component in addition to activated carbon and more preferably contains elements selected from both (b) component and (a) component in addition to activated carbon is also effective for waste water treatment.

(a) component: at least one element selected from the group consisting of Ti, Zr, Hf, Nb, Ta, Fe, Co, Mn, Al, Si, Ga, Ge, Sc, Y, La, Ce, Pr, Mg, Ca, Sr, Ba, Xn, Sn, Sb and Bi.

(b) component; at least one element selected from the group consisting of Pt, Pd, Rh, Ru, Ir and Au.

The catalyst containing the elements selected from both (a) component and (b) component as a catalyst ingredient exhibits excellent heat resistance compared with the catalyst containing activated carbon and (b) component and with the catalyst consisting of activated carbon alone. By improving the heat resistance, deterioration of mechanical strength of the catalyst after using the waste water treatment can be prevented and the decrease in the catalyst amount by being combusted thereof and/or being powdered thereof can be drastically suppressed. Further more, oxidation resistance of the catalyst surface (surface of the activated carbon) is improved which enables to suppress the deterioration of the catalyst performance caused by the oxidation. With the synergistic effect of the above mentioned advantages of the catalyst, the present inventive catalyst maintains its excellent performance of oxidizing/decomposing the oxidizable substances in the waste water for long period.

The present inventive catalyst contains the element(s) selected from (a) component and/or (b) component, where necessary, which are deposited on activated carbon. (a) component improves oxidation resistance of the catalyst (activated carbon) thereby suppressing the deterioration of the catalyst performance caused by the oxidation. The catalyst containing (a) component enables the wet oxidation to conduct at higher temperature and under considerably large amount of oxygen containing gas supply compared to the catalyst without (a) component. (a) component heightens the wet oxidation performance, the degree of purification, the durability of the catalyst and the cost performance of the wet oxidation. And also (a) component heightens the activity derived from the (b) component, namely, the catalyst containing (a) component exhibits high catalytic activity even with small amount of (b) component. Considerably large amount of (b) component can be deposited on the surface of carrier (activated carbon) and (b) component can be highly dispersed into the carrier with suppressing cohesion and movement of (b) component by containing the (a) component in the carrier. In other words, (a) component acts as a promoter having various effects such as improving the catalytic activity and the durability of the catalyst.

Total amount of (a) component (relative to the total amount of the catalyst) is not specifically limited but preferable amount of (a) component in the solid catalyst is in the range from 0.1 to 10 mass %, more preferable lower limit is 0.3 mass %, and most preferably 0.5 mass %. If the amount of (a) component is less than lower limit, above mentioned (a) component effect may hardly obtainable. And more preferable upper limit is 7 mass % and most preferably mass %. If the amount of (a) component exceeds upper limit, the specific surface area and the pore volume of the catalyst may be decreased by being covered its surface (surface of activated carbon) by oversupplied (a) component and the suppression of cohesion and movement of (b) component may be deteriorated. And also excess amount of (a) component may lower the catalytic activity by entrapping (b) component inside (a) component or may lower the adsorbability of oxygen and oxidizable substances on the catalyst.

It should be noted that among (a) component, preferable element for obtaining above mentioned effect is at least one selected from the group consisting of Ti, Zr, Fe, Mn, Ce and Pr, and also more preferable element is at least one element selected from the group consisting of Ti, Zr, and Fe. The most preferable element is Ti or Zr. The form of (a) component contained in the catalyst is not specifically limited as long as the component is metal or metal compounds thereof. Preferable form of the (a) component is metal or metal compounds thereof which is insoluble or refractory to water and more preferable form is metal, oxide, or composite oxide thereof which is insoluble or refractory to water.

(b) component exhibits as main activity ingredients of the catalyst for oxidizing/decomposing oxidizable substances. Total amount of (b) component (relative to the total amount of catalyst) is not specifically limited but preferable amount of (b) component in the solid catalyst is in the rang from 0.05 to 2 mass %, and more preferable lower limit is 0.1 mass % and more preferable upper limit is 1 mass %. If the (b) component amount is less than lower limit, above mentioned (b) component effect may not be obtained. If the (b) component amount is exceeds upper limit, the price of the catalyst may be sacrificed.

Among (b) component, preferable element for obtaining above mentioned effect is at least one element selected from the group consisting of Pt, Pd and Ru, and also more preferable element is Pt or Pd and the most preferable one is Pt. The form of (b) component contained in the catalyst is not specifically limited as long as the component is metal or metal compound thereof. Preferable form of the (b) component is metal or metal oxide compound thereof and more preferably metal.

The catalyst of this invention for treating the waste water may incorporate in any of the catalyst mentioned above for treating waste water and may incorporate in any catalyst used in wet oxidation process other than mentioned above. Further more the present inventive catalyst may incorporate with the wet oxidation which is not designed for utilizing solid catalyst.

Property of the catalyst according to the present invention is not specifically limited. Preferable specific pore volume having pore diameter in the range from 0.1 to 10 $\mu$m is in the range from 0.1 to 0.8 ml/g and specific surface area of the catalyst measured by the Brunauer-Emmett-Teller (BET) is in the range from 100 to 2500 m$^2$/g. More preferable lower limit of the specific pore volume is 0.15 ml/g and most preferably 0.2 ml/g. And also more preferable upper limit of the specific pore volume is 0.7 ml/g and most preferably 0.6 ml/g. Preferable lower limit of the specific surface area is 500 m$^2$/g, more preferably 800 m$^2$/g and most preferably 900 m$^2$/g. And preferable upper limit of the specific surface area is 2000 m$^2$/g, more preferably 1700 m$^2$/g and most preferably 1500 m$^2$/g.

The property of activated carbon may be decreased when preparing the catalyst by supporting (a) component.

Preferable specific pore volume having pore diameter in the range from 0.1 to 10 $\mu$m is preferably in the range from 0.15 to 0.6 ml/g and more preferably in the range from 0.2 to 0.5 ml/g. The specific surface area of the catalyst measured by BET is preferably in the range from 400 to 1600 m$^2$/g, more preferably from 600 to 1200 m$^2$/g and most preferably from 700 to 1100 m$^2$/g.

According to the present inventive waste water treatment, the pore having pore diameter in the range from 0.1 to 10 $\mu$m, namely micro pore, have an great influence on diffusion of oxygen and oxidizable substances contained in the waste water into the catalyst. If the bulk of the solid catalyst consists of pore having pore diameter of 0.1 to 10 $\mu$m, oxygen and the oxidizable substances are readily diffused into the catalyst which promotes the wet oxidation efficiency at low temperature and under low pressure. If the specific pore volume having pore diameter in the range from 0.1 to 10 $\mu$m is less than 0.1 ml/g, oxygen and the oxidizable substances are hard to diffuse into the catalyst which may be resulted in deteriorating the adsorption of the oxidizable substances to active site of the catalyst and also which may be resulted in deteriorating the usability of oxygen for decomposing oxidizable substances and excess oxygen may cause the activated carbon itself to be combusted.

Further more, if the specific pore volume having pore diameter in the range from 0.1 to 10 $\mu$m exceeds 0.8 ml/g, the catalyst may suffer a decrease in the mechanical strength. Accordingly, the catalyst having above mentioned specific pore volume having pore diameter from 0.1 to 10 $\mu$m is recommended.

If the specific surface area of the catalyst is less than 100 m$^2$/g, the catalyst may suffer a decrease in adsorption of oxidizable substances to the active site and the purification of the waste water may be attained incompletely. If specific surface area of the catalyst exceeds 2500 m$^2$/g, the catalyst may suffer a decrease in the mechanical strength. Accordingly, the catalyst having above mentioned specific surface area of the catalyst is recommended.

The decrease value of the specific pore volume having 0.1 to 10 $\mu$m pore diameter after (a) component is deposited on activated carbon is preferably in the ranging of 0.01 to 0.5 ml/g, more preferably from 0.05 to 0.4 ml/g and most preferably 0.1 to 0.3 ml/g compared with the specific pore volume of the activated carbon. The decrease value of the specific surface area of the catalyst after (a) component is deposited on the activated carbon is preferably of from 50 to 800 m²/g, more preferably from 100 to 700 m²/g and most preferably 200 to 600 m²/g.

The catalyst which is satisfied with above mentioned catalyst property and the property derived from the decrease value is suitable for treating the waste water. If the decrease value of the specific pore volume is less than 0.01 ml/g and the decrease value of the specific surf ace area is less than 50 m²/g, the pore portion of the activated carbon may be covered by (a) component inefficiently and the catalyst may suffer a decrease in catalytic activity and durability. If the decrease value of the specific pore volume exceeds 0.5 ml/g and the decrease value of the specific surface area exceeds 800 m²/g, pore portion of the activated carbon, which facilitates the oxidation/decomposition, may be covered by (a) component and the catalyst may suffer decrease in catalytic activity. It is also recommended to adjust the heat treatment condition when preparing the catalyst to suppress the decrease in the catalyst property.

When oxidation treatment or reduction treatment is applied to activated carbon, the property of activated carbon have been understood that the activated carbon changes its property drastically by introducing polar group into the surface of the activated carbon or by removing polar group from its surf ace. Similarly, the catalyst used in the present inventive method changes its properties and its performance considerably in accordance with the amount of polar group introduced into the catalyst. According to the present invention, especially the relationship between the amount of polar group introduced and the property of catalytic activity depends on the oxidizable substances in the waste water. If the oxidizable substances are mostly organic substances and/or inorganic anion substances, the catalyst contains a small amount of polar group and which requires the catalyst a high hydrophobic property. Accordingly, reduction treatment applied catalyst (explained later) tends to exhibit higher catalyst activity. If the oxidizable substances are mostly inorganic cation substances such as ammonia and hydrazine, the amount of polar group in the catalyst containing activated carbon needs to be large. Accordingly, oxidation treatment applied catalyst (explained later) tends to exhibit higher catalytic activity.

The present inventors considered that the change in the catalyst properties and performances depends largely on the adsorption readiness of the oxidizable substance to the catalyst. Most of the polar group in the catalyst is oxygen containing functional group such as hydroxyl group and carboxyl group. Therefore, the present inventive catalyst containing activated carbon has correlation with, not limited to, the polar group amount in the catalyst and a the ratio of oxygen amount and carbon amount (herein after may be referred to as "oxygen/carbon ratio") in the catalyst. This correlation indicates that when the catalyst contains small quantities of the polar group, the value of the oxygen/carbon ratio is small. On the contrary, when the catalyst contains large quantities of the polar group, the value of the oxygen/carbon ratio is large. With the oxygen/carbon ratio, the present inventive catalyst can be classified as favorable catalyst and as unfavorable catalyst for treating oxidizable substances. To be more specific, when the oxidizable substances are organic substances or inorganic anion substances, the favorable catalyst for treating these oxidizable substances indicates the oxygen/carbon ratio in the range from 0 to 0.12, more preferably from 0 to 0.10 and most preferably from 0 to 0.08. On the contrary when the oxidizable substances are inorganic cation substances such as ammonia and hydrazine, the favorable catalyst for treating thereof indicates the oxygen/carbon ratio in the range from 0.08 to 0.30, more preferably from 0.10 to 0.25 and most preferably from 0.12 to 0.20. If the oxygen/carbon ratio exceeds above mentioned range, the catalyst may suffer a decrease in the mechanical strength.

The catalyst used in present inventive method is not limited to any specific types as long as the catalyst contains activated carbon, but it is recommended to adjust the value of the oxygen/carbon ratio to meet the desired purposes by applying a wide variety of treatment to the catalyst during its preparation. Specifically, for preparing the catalyst containing small quantities of the polar group with small oxygen/carbon ratio, a reduction treatment is preferably applied to the catalyst. As the reduction treatment, such as gaseous phase reduction using hydrogen, and liquid phase reduction using reductant (e.g. sodium sulfite, hydrazine) are exemplified. During the reduction treatment, active ingredient of the catalyst is reduced and/or activated carbon (surface of the activated carbon) is hydrogenated where by the catalyst having high activity to inorganic anion compounds and organic compounds is prepared. Generally used activation treatment applied to a production process of activated carbon can be employed as reduction treatment. Such an activated treatment as contacting the catalyst with vapor, carbon gas, or nitrogen gas at high temperature is employable.

For preparing the catalyst containing large quantities of polar group with large oxygen/carbon ratio, a oxidation treatment is preferably applied to the catalyst. As the oxidation treatment, such as gaseous phase oxidation using oxygen containing gas, ozone, or NOx, and liquid phase oxidation using oxidant (i.e. hydrogen peroxide, ozone aqueous solution, bromine water, permanganate, dichromate, hypochlorite, nitric acid and phosphoric acid) are exemplified. During the oxidation treatment, active ingredient of the catalyst is oxidized and/or polar group such as functional groups having oxygen is introduced to activated carbon (surface of the activated carbon) whereby the catalyst having high activity to inorganic cation compounds such as ammonia and hydrazine is prepared. A treatment such as nitration, sulfonation, amination and a treatment by alkali metal compounds can be applied to the catalyst during its production process.

As mentioned above, the catalyst for use in the present invention having an excellent adsorption property of oxidizable substances on the catalyst exhibits higher catalyst activity. Property of the present inventive catalyst can be measured by adsorption property of oxidizable substances. As an example, when the waste water contains organic compounds as a oxidizable substances, the adsorption property can be measured based on the adsorbability of organic compounds and its oxidized/decomposed substances on the catalyst. Further more, when the organic compounds consist of more than 2 carbon atoms per molecule, acetic acid tends to remain in treated water (a water treated by wet oxidation). The catalyst containing activated carbon having excellent adsorbability of acetic acid exhibits higher catalytic activity for organic compound. On the contrary, the catalyst containing activated carbon having excellent adsorption ability of ammonia exhibits higher catalytic activity to inorganic cation compounds when the waste water contains inorganic cation compounds such as ammonia and hydrazine as a oxidizable substances. Activated carbon contained in the catalyst having excellent adsorbability of oxidizable substances is evaluated as an activated carbon having higher adsorbability of oxidizable substances. Accordingly, the activated carbon having excellent adsorbability of oxidizable substances is preferably employed for preparing the present inventive catalyst, "Excellent adsorbabllity" herein means the adsorption amount of the catalyst when conducting adsorption test under certain condition by measuring saturated adsorption amount of object ingredients per activated carbon unit. Activated carbon having excellent adsorbability exhibits larger saturated adsorption amount. And also, excellent adsorbability can be means the rate of the adsorption under certain condition. Activated carbon having faster adsorption rate of oxidizable substances excels in adsorption property. The adsorption rate can be measured at any time of the adsorption test and the rate can be expressed by using any method. The adsorption rate at the beginning of the adsorption test is preferably employed in the present invention. The catalyst containing activated carbon having faster adsorption rate at the beginning of the test exhibits excellent adsorptivity and higher catalytic activity.

Since the present inventive catalyst can be defined with a wide variety of property, the present inventive catalyst is not limited to the catalyst having above mentioned property. The present inventive catalyst can be further defined by using properties such as amount of functional groups, amount of ash content, amount of impurities, structure of carbon, acidity, volume amount of pore other than macro pore (i.e. meso pore, micro pore and sub-micron pore), ratio of the pore (i.e. meso pore, micro pore and sub-micron pore), outer surface area, inner surface area and the ratio of outer and inner surface area of the present inventive catalyst.

The method for producing the catalyst containing both (a) component and/or (b) component is not specifically limited. Various methods are available for producing the catalyst such as depositing (a) component and/or (b) component on activated carbon. The catalyst can be molded into various shape after depositing (a) component and/or (b) component on the activated carbon, subsequently (a) component and/or (b) component can be further deposited on the molded catalyst. Among them preferable production method for preparing the present inventive catalyst is to deposit (a) component and/or (b) component on activated carbon.

Various method can be taken for depositing (a) component and (b) component on activated carbon such as depositing (b) component after (a) component is deposited on activated carbon, depositing (a) component after (b) component is deposited on activated carbon, and depositing both (a) component and (b) component at the same time. Among them preferable depositing method is to deposit (b) component after depositing (a) component on activated carbon for preparing the present inventive catalyst which exercises its effect brought by adding (a) component and (b) component which excels in catalyst performance. The reason for the excellent catalyst performance, which is brought by the above mentioned preferable catalyst preparation process, is not completely clarified, the present inventors have considered as following.

The catalyst prepared by depositing (a) component on the activated carbon before depositing (b) component may have the following structure:

(a) component is deposited on the surface of the activated carbon and inside the pore thereof.

(b) component is deposited on the further outer surface of the activated carbon and on the further outer surface of the pore compared with that of the (a) component deposited on the activated carbon, and also (b) component is deposited on the surface of the (a) component. Namely, the presence of (b) component placing on the outer surface thereof greatly improves the catalytic activity. With the aid of (a) component, (b) component can be prevented from being deposited on the deep inside of the pore, which is hardly susceptible to the oxidation/decomposition of the oxidizable substances. And also distributed (a) component on the surface of activated carbon exercise distribution effect as block for suppressing the cohesion and the movement of (b) component. Taking the above mentioned catalyst structure, (a) component feeds oxygen to (b) component effectively thereby promotes the oxidation/decomposition of the oxidizable substance and leading to prevent activated carbon from being oxidized/deteriorated by oxygen. Accordingly, the catalyst having above structure can exercise each component ability effectively.

The catalyst prepared by depositing (a) component after depositing (b) component on activated carbon, or the catalyst prepared by depositing both (a) component and (b) component at the same time has smaller amount of (b) component existed on the surface of activated carbon, namely on (a) component, than that of the catalyst prepared by depositing (b) component after depositing (a) component on activated carbon.

When depositing (a) component before depositing (b) component on activated carbon, applying a treatment for stabilizing (a) component is recommended. The effective treatment for stabilizing (a) component can be heat treatment as exemplified following. After depositing (a) component with the treatment such as impregnation method or adsorption method, thus obtained catalyst precursor is preferably processed by heat treatment (e.g. drying or calcination). The heat treatment can be conducted in oxidizing atmosphere (e.g. in the air) or in inactive gas atmosphere (e.g. nitrogen). Inactive gas is preferably employed for suppressing the oxidation and deterioration of activated carbon. When the precursor is heat treated in oxidizing atmosphere (e.g. in the air), the temperature thereof is preferably in the range from 80 to 500° C., more preferable lower limit is 150° C. and most preferably 200° C. And also, more preferable upper limit is 400° C. and most preferably 300° C. When the precursor is heat treated in an inactive gas atmosphere, the temperature thereof is preferably in the range from 80 to 600° C. and more preferable lower limit is 150° C. and most preferably 200° C. And also, more preferable upper limit is 500° C. and most preferably 450° C.

According to the present inventive method, heat treatment is also effective for stabilizing (b) component after (b) component is deposited on the precursor. The heat treatment can be conducted in oxidizing atmosphere (e.g. in the air), in inactive gas atmosphere (e.g. nitrogen) or in reducing atmosphere (e.g. hydrogen containing gas). Among them reducing atmosphere is preferably employed in view of improving the catalytic activity, if (b) component exists as metal thereof (in most cases (b) component exists as metal thereof when the oxidizable substances are organic compound) and if the catalyst exhibits higher hydrophobic property by removing polar group such as hydroxyl group and carbonyl group of activated carbon. When the precursor, on which (b) component is deposited, is heat treated in oxidizing atmosphere or in inactive gas atmosphere, the temperature thereof is preferably selected in ranging from 80 to 400° C. and more preferable lower limit is 150° C. and more preferable upper limit is 300° C. When the precursor is heat treated in reducing atmosphere, the temperature thereof is preferably selected in the range from 150 to 600° C., more preferable lower limit is 200° C. and most preferably 250° C. Also, more preferable upper limit is 500° C. and most preferably 450° C. With the heat treatment other than mentioned above, (b) component can be stabilized such as by reducing agent (e.g. sodium borohydride).

When adding (a) component and (b) component to activated carbon, varieties of compounds containing (a) component and/or (b) component can be employed in accordance with the needs and preferable compounds may be water soluble compounds, or inorganic compounds containing (a) compound and/or (b) component. Also, the compounds may be emulsion form, sully form, and colloid form, or simple substance thereof can be used.

For increasing the effect derived from (b) component, preferably 90 mass % of the (b) component contained in the catalyst exists within surface depth of 600 $\mu$m. Namely, the catalyst containing (b) component forms preferably egg shell type catalyst or egg white type and more preferably egg shell type catalyst. To meet this requirement, any method can be applied to deposit (b) component within the above mentioned surface depth of the catalyst. As an example, the activated carbon is impregnated with liquid containing (b) component by the impregnation method. The liquid containing (b) component is prepared by adding predetermined amount of inorganic salt of (b) component to water. The water is prepared so that the amount of water is in proportion to water absorption coefficiency of the activated carbon. And after activated carbon is uniformly impregnated with the liquid containing (b) component, the catalyst (activated carbon) is dried uniformly in inactive gas atmosphere whereby (b) component can be uniformly deposited on the surface area of the catalyst. As an preparation method of the catalyst having above mentioned properties, absorption method and spraying method can be employable instead of impregnation method.

If the present inventive catalyst consists essentially of activated carbon as a carrier, (a) component and (b) component as a catalyst ingredients, the present inventive catalyst can exhibit above mentioned excellent effect. In this case, the catalyst may possibly contain as extraneous matter therein such substances and impurities as are entrained by the precursor of the catalyst and such substances and impurities as are admitted in the catalyst in the process of production. If the catalyst of this invention contains these substances in minute amounts, their functions as a catalyst will not be impaired at all unless these substances produce an appreciable influence on the physical properties of the catalyst. p The present invention will be explained with the reference to the Figures. FIG. 1 is a schematic diagram of the system for use in the method of this invention. It should be noted that the apparatus of FIG. 1 is just an example of an apparatus usable in the method of the present invention, and the present invention does not necessarily use this apparatus.

Waste water supplyed from a waste water supply source (not shown) is fed to a heater 3 through line 6 by waste water feed pump 5. Oxygen containing gas (e.g. air) is supplied through oxygen-containing gas supply line 8 and pressurized by compressor 7 and the oxygen containing gas is supplied to the water water before the waste water is fed to the heater 3. The supply amount of the oxygen containing gas is controled by oxygen-containing gas flow control valve 9. Oxygen added waste water heated by the heater 3 is introduced into the reactor 1 from its head with mesureing the pressure thereof by pressure gauge indicator PI.

The reactor 1 is equipped with electric heater 2 which maintains the temperature in the reactor 1 at predetermined desired level. The reactor 1 is also charged with the catalyst bed (not shown) by which the oxidizable substances in the waste water is oxidized and/or decomposed. The space velocity at catalyst bed (namely passing rate of the waste water through the catalyst bed) is not specifically limited, and preferably in the range from 0.1 hr$^{-1}$ to 10 hr$^{-1}$, more preferably from 0.2 hr$^{-1}$ to 5 hr$^{-1}$ and most preferably from 0.3 hr$^{-1}$ to 3 hr$^{-1}$. If the space velocity is less than 0.1 hr$^{-1}$, the amount of the waste water to be treated will be unduly small and the facility will be unduly large. If the space velocity exceeds 10 hr$^{-1}$, the efficiency of the decomposition/oxidation of oxidizable substances will be unduly low. It should be noted that the oxygen containing waste water is introduced into the reactor 1 from its head and treated waste water (e.g. treated water) is extracted from its bottom. The gas-liquid (e.g. oxygen containing gas and the waste water) flow type at the catalyst bed is gas-liquid concurrent descending. Namely, the reactor 1 is tricle-bed reactor.

After the waste water is decomposed/oxidized in the reactor 1, thus obtained treated water flows from the bottom of the reactor 1 to cooler 4 for cooling down. And then the liquid ejected from pressure control valve 12 is fed to gas-liquid separator 11. The pressure control valve 12 maintained the pressure inside the reactor 1 at predetermined pressure level in accordance with the value obtained from the pressure gauge indicator PI.

Gaseous components are separated from the treated water in gas-liquid separator 11. The gaseous componets (exhaust gas) are ejected via conduit 13 and the liquid is ejected via conduit 15 by treated water exhaust pump 14. The concentration of oxygen contained in the exhaust gas is mesured by concentration meter 16 in the separator 11. Liquid level is detected by liquid level controler LC and the liquid level is controled by adjusting the pump 14 to maintain a certain liquid level.

Figure 2:
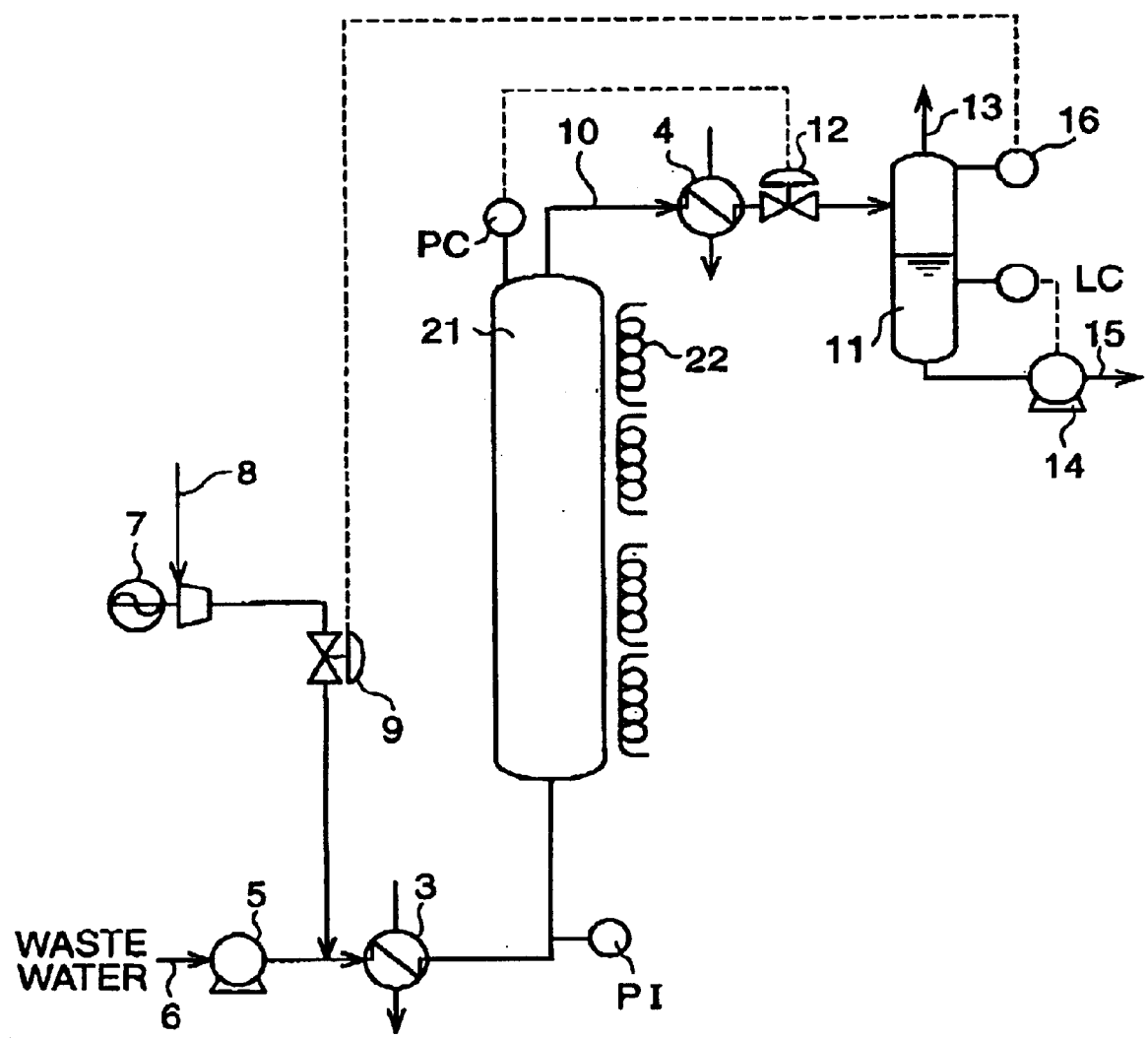
FIG. 2 is a schematic diagram of the system for use in the method of this invention.

FIG. 2 is a schematic diagram of the system for use in the method of this invention. Bxpranation to the process which is using similar apparatus with the aforementioned apparatus used in FIG. 1 is ommited (same number may be attached to the apparatus in FIG. 2, FIG. 3 and FIG. 4 as that in FIG. 1.)

According to FIG. 2, the waste water heated at the heater 3 is supplied to the reactor 21 from its bottom. After the waste water is treated in the reactor 1, thus obtained treated water is extracted from its head. The gas-liquid flow type at the catalyst bed is gas-liquid concurrent ascending.

Figure 3:
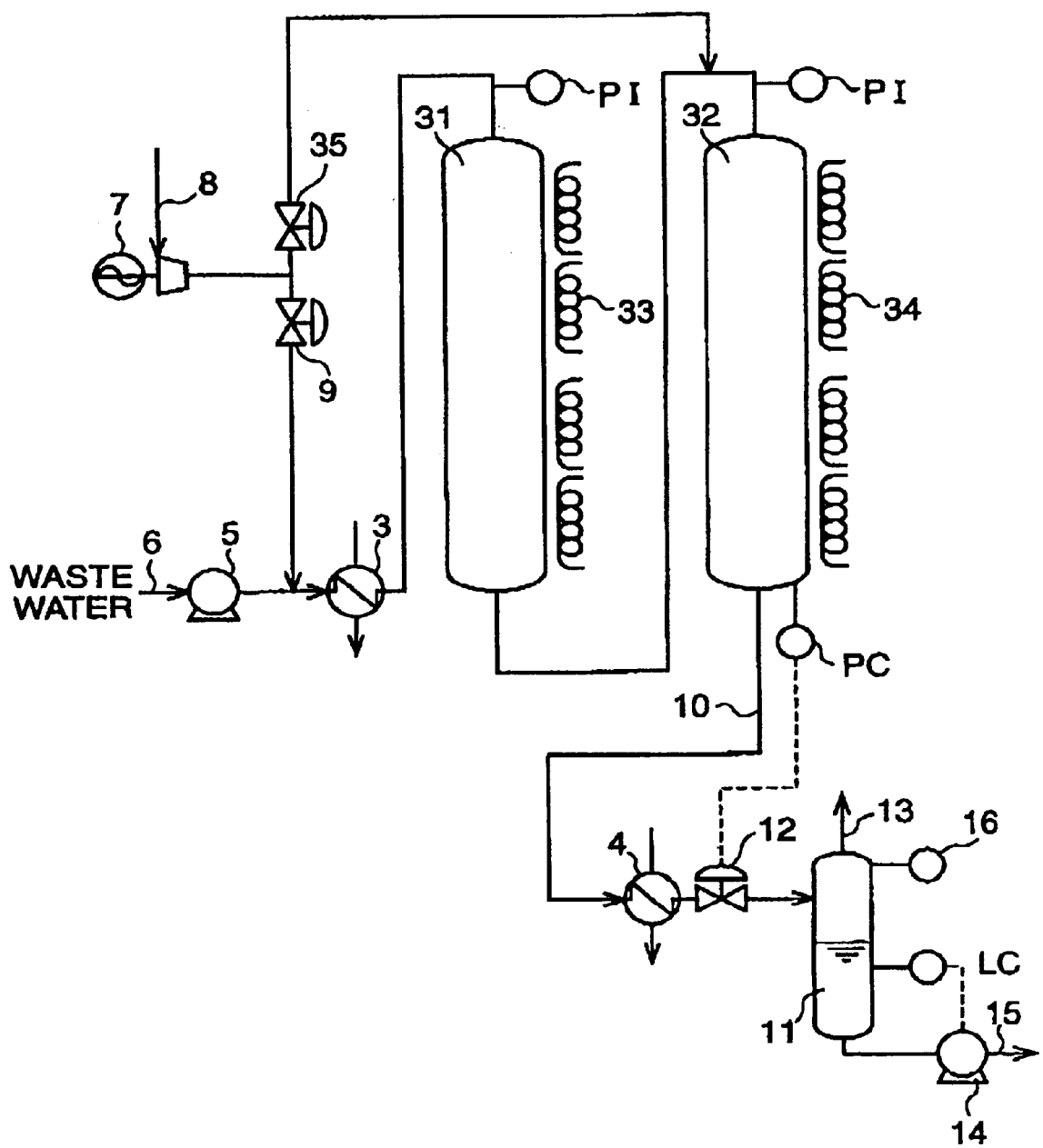
FIG. 3 is a schematic diagram of the separation unit for use in the method of this invention.

FIG. 3 is a schematic diagram of the system for use in the method of this invention in which reactors 31 and 32 having same flow type (gas-liquid concurrent descending) with FIG. 1 are arranged in series. Oxygen containing gas is supplied to the waste water through valve 35 and valve 9.

According to the present invention, the number, kind, and shape of the reactor are not specifically limited, and one or more reactors which have been conventionally used in wet oxidation may be employed. For example, the reactor may be of a single-tube type or a multiple-tube type. For treating the waste water with high oxydizable substance concentration, which may bring high heating value by treating thereof, multiple-tube type reactor having high heat elimination capability is preferably employed. For treating the waste water with low oxydizable substance concentration, multiple-tube type reactor having heat adding capability is preferably employed. Further more, when employing the plurality of reactors, the reactors may be installed in parallel or in series according to needs.

The temperature for the catalytic wet oxidation treatment according to this invention is in the range from 50° C. to less than 170° C. If the temperature of this treatment is less than 50° C., the treatment of organic oxidizable substances and inorganic oxidizable substances may be effected with unduly low efficiency and the purification of the waste water may be attained incompletely. The preferable temperature is not less than 80° C., more preferably not less than 100° C. and most preferably not less than 110° C. If the temperature is less than 100° C. organic compound having one carbon atom per molecule such as methanol, formic acid and formaldehyde can be decomposed by using the present inventive catalyst. For treating the waste water containing organic compound having 2 or more carbon atoms per molecule, the temperature is preferably set at 100° C. or more. If the temperature of this treatment exceeds 170° C., activated carbon itself is liable to be brought into combustion and the catalyst losts economic application. Preferable upper limit of the temperature is at 160° C., more preferably at 150° C. and most preferably at 140° C.

The pressure under which the waste water is treated is suitably selected, depending on the relation between this pressure and the treating temperature. It has no particular restriction except for the requirement that the sufficient pressure is applyied for enabling the waste water to retain the liquid phase thereof. It is of ten the case that a pressure is selected in the range from atmospheric pressure to 1 MPa (Gauge) is selected. If the temperature for the catalytic wet oxidation treatment excells 50° C. and less than 95° C., atmospheric pressure can be applyied for economical operation and preferably adding suitable pressure to the waste water is reccommended for improving the efficiency of the waste water treatment. If the temperature exceeds 95° C., the waste water may be no longer capable of retaining the liquid phase thereof under atmospheric pressure and applying pressure in the range from 0.2 to 1 MPa (Gauge) is needed to keep its liquid phase. If the pressure exceeds 1 MPa (Gauge) at this temperature, the treatment may incur heavy operational cost. If excessive pressure is applied the activated carbon itself is liable to be conbusted and/or the catalystic activity may be deteriorated. According to the present invention, for avoiding aforementioned problem, the pressure can be adjusted by controlling output pressure of the reactor 1 with pressure control valve 12 so as to the waste water can keep its liquid phase in the reactor 1. For improving the wet-oxydation performance and the durability of the catalyst, the pressure fluctuation shall be within plus or minus 20%, more preferably within plus or minus 10% and most preferably plus or minus 5%.

According to the present invention, the concentration of oxygen in the exhaust gas needs to be maintained in the rang of from 0 to 5 vol %. The oxygen concentration in this range gives an effective purification of the waste water and a highly effective treatment of the oxidizable substances in the waste water for a long period. If the concentration exceeds 5 vol %, the activated carbon may be liable to be combusted by redundant supply of oxygen and which resulted in unstable operation. Accordingly the wet-oxidation is preferably operated with supplying enough oxygen for oxidizing/decomposing the oxidizable substances. The preferable oxygen concentration in the exhaust gas is close to 0 vol % which is not under-supply condition for oxidizing/ decomposing the oxidizable substances. If oxygen is under-supplied, the treatment of the waste water may suffer unduly low efficiency in accordance with the increase of oxygen deficiency. If the oxygen concentration is slightly less than the upper vol % of the oxygen concentration, the catalytic activity of the present inventive catalyst and the efficiency of the waste water treatment may be improved. The slightly oxygen deficiency condition improves durability of the catalyst and the wet-oxidation enjoys stable waste water treatment for a long period. According to the present invention, The upper limit of oxygen concentration is preferably 4 vol %, more preferably 2 vol % and most preferably 1 vol %.

According to the present invention, if the oxygen supply amount is slightly less than 5 vol %, the catalytic activity of the present inventive catalyst and the efficiency of the waste water treatment will be improved. The factor of this trend may be that the active point of the catalyst surface (e.g. the active point of the activated carbon) and/or the (b) component in the catalyst become reduction state under the slightly oxygen deficiency condition which resulted in improving the catalytic activity. And also under the slightly oxygen deficiency condition, the activated carbon is reduced to give improved hydrophobic property to the surface thereof. If the oxidizable substances are organic compounds, the activated carbon enjoys improved adsorbability of the oxidizable substances and this invention can treat waste water with high efficiency.

The concentration of oxygen can be suitably controlled within the above mentioned range with variety of method, for example the concentration meter 16 can be employed for measuring the concentration of the oxygen in the exhaust gas and the oxygen supply amount can be controlled by the valve 9 based on the result obtained from the concentration meter 16. Any types of concentration meter can be employed such as zirconia type oxygen analyzer, oxygen dumbbell type oxygen analyzer and gas chromatograph.

When starting up the wet oxidation process with supplying oxygen containing gas, the oxygen supply amount is preferably adjusted to the amount slightly less than that of needed for the oxidation/decomposition. This invention preferably treats the waste water under the slightly oxygen deficiency condition such as 0 vol % of oxygen concentration in the exhaust gas. Starting from 0 vol % of the oxygen concentration, the oxygen supply amount is gradually increased until it reached most suitable oxygen amount for sufficiently oxidizing/decomposing the oxidized substances when starting up the wet oxidation process. The supply amount of the oxygen containing gas may be controlled by the result of oxygen concentration in the exhaust gas or by the analyzed result of the treated water. When starting up the wet oxidation deterioration of the catalyst, which is caused by oversupply of the oxygen, can be avoided. By properly controlling the oxygen supply amount. Further more, the catalytic activity may be improved by providing the reduction treatment, as needed, to the catalyst when treating the waste water. The catalyst can deal with the change of the oxidizable substance concentration and the change of the ingredient in the waste water. If the waste water treatment suffers unduly low efficiency due to the shortage of the oxygen supply, the treated water can be processed by the present inventive method again for obtaining highly purified water. This invention does not particularly prohibit a waste water from being treated by the conventional method of purification.

According to the present invention, the term "oxygen concentration in the exhaust gas" means the oxygen concentration in the gas phase obtained by treating the waste water with the use of the catalyst. In general, the oxygen concentration is determined by measuring the oxygen concentration in the gas-liquid separator as shown in FIG. 1 and FIG. 2.

According to the present invention, the supply amount of the oxygen containing gas need to be adjusted in accordance with the actual processing efficiency for efficiently oxidizing/decomposing organic and/or inorganic oxidizable substances contained in the waste water.

The preferable condition for controlling the oxygen concentration in the exhaust gas within the range from 0 to 5 vol % is to set [oxygen amount in the oxygen containing gas supplied]/[oxygen demand of the waste water at maximum waste water treatment efficiency](hereinafter may be referred to as "D value")=0.8 to 1.3. The durability and the performance of the catalyst can be remarkably improved by adjusting the oxygen supply amount to the aforementioned D value.

The [oxygen demand of the waste water at maximum waste water treatment efficiency] is measured by changing the oxygen containing gas supply amount under the fixed condition of the temperature, the pressure, LHSV, gas-liquid current type, and the catalyst to be used for the wet-oxidation. In other words, [oxygen demand of the waste water at maximum waste water treatment efficiency] means required oxygen amount of the waste water when the waste water treatment efficiency rate indicates its maximum efficiency rate under above condition. The D value can be used as an index for indicating excess and deficiency of the oxygen supply amount. For example, if the treatment efficiency in terms of the chemical oxygen demand (COD (Cr) is 90% at maximum when treating the waste water by changing the oxygen supply amount with the predetermined wet oxidation condition, D value=1.0 can be obtained with the supply of oxygen containing gas at a rate of $O_2/COD$= 0.9. If the oxygen containing gas is supplied at a rate of $O_2/COD$=1.1, D value is 1.11. [oxygen demand in the waste water at maximum waste water treatment efficiency], which is denominator of D value, does not necessarily equals to the value of "oxygen supply amount in the waste water at maximum waste water treatment efficiency" If the $O_2/COD$ (Cr)=90% at maximum and aforementioned oxygen containing gas supply amount is $O_2/COD$ (Cr)=0.9, oxygen containing gas supply amount equals to D value. If the COD (Cr)=90% at maximum and the $O_2/COD$ (Cr)=2.0, D value is 2.22.

If D value exceeds 1.3, the oxygen gas supply amount exceeds the amount required for the oxidation/decomposition treatment and the activated carbon itself may be liable to be combusted. If D value is less than 0.8, the oxygen supply amount is less than the amount required for the oxidation/decomposition treatment and the treatment of oxidizable substances may be effected with unduly low efficiency which is economically unacceptable. The preferable lower limit of D value is 0.9 and more preferably 0.95. The preferable upper limit is 1.2 and more preferably 1.1.

The term "the waste water treatment efficiency", which is represented by [oxygen demand in the waste water at maximum waste water treatment efficiency] can be expressed by any treatment efficiency to meet the purification object of ingredient contained in the waste water and such a treatment efficiency can be exemplified as COD treatment efficiency, TOC treatment efficiency, nitrogen treatment efficiency, BOD treatment efficiency, TOD treatment efficiency and any other specific substance treatment efficiency.

The kinds of the oxygen containing gas to be used in this invention is not specifically limited as far as it contains oxygen molecules. As examples such a gas include, but not limited to, pure oxygen, oxygen enriched gas, air, and exhaust gas containing oxygen from other plants. And also these oxygen containing gas can be used by diluting with inactive gas. The air is inexpensive and advantageously used. The activated carbon may be liable to be combusted and/or the catalytic activity may be deteriorated by using oxygen enriched gas containing 50 vol % or more of oxygen concentration and pure oxygen. The activated carbon may not be combusted and the solubility of oxygen in the waste water is increased by using oxygen enriched gas containing preferably less than 40 vol %, and more preferably less than 35 vol % of the oxygen concentration. Thereby this invention enjoys the improved wet oxidation performance. A production process for preparing the oxygen enriched gas suitable for the present invention is not specifically limited but can be exemplified such as chilled method, PSA method. As an process for preparing the oxygen enriched gas with less cost and simple safe operation, oxygen enrichment membrane is preferably employed to regulate the oxygen concentration. Instead of using the oxygen containing gas, hydrogen peroxide aqueous solution can be used.

According to the present invention, stable and efficient treatment of the waste water can be achieved with any gas-liquid flow type at the catalyst bed as long as the oxygen concentration in the exhaust gas is maintained within the range from 0 to 5 vol %. Among them, gas-liquid concurrent descending such as shown in FIG. 1 and FIG. 3 is recommended. The gas-liquid concurrent descending promotes gas-liquid contact rate which resulted in increasing oxygen dissolving amount in the waste water and in increasing the treatment efficiency. With gas-liquid concurrent flow, the waste water containing plenty of oxidizable substances is contacted with the gas having high oxygen concentration at the entrance of the catalyst bed and which prevents the activated carbon from being combusted. On the contrary, with gas-liquid countercurrent flow, the waste water containing reduced amount of oxidizable substances is contacted with the gas having high oxygen concentration at the exist of the catalyst bed which may cause the activated carbon to be combusted and the catalytic activity may suffur unduly deterioration.

Further more, when the wet oxidation is conducted under pressure in the range from atmospheric pressure to 1 MPa (Gauge) with gas-liquid concurrent ascending flow in the reactor such as shown in FIG. 2, the oxygen supply amount is preferably 1.5 times or more and more preferably 2.0 times or more of the theoretical oxygen demand for promoting the treatment efficiency. Thereby the gas-liquid concurrent ascending flow may be unsuitable for improving the treatment efficiency when using the present inventive catalyst with the gas having oxygen concentration in the range from 0 to 5 vol %. The term "theoritical oxygen demande" means an amount of oxygen required for decomposing/oxidizing the oxidizable substances in the waste water into such as water, carbon dioxide gas, nitrogen gas, inorganic salts, ash content and so on.

According to the present invention, the method of supplying oxygen containing gas is not specifically limited and as an example, all the amount of the oxygen containing gas can be supplied from the upstream of the catalyst bed entrance and more preferably, supplying the oxygen containing gas from at least two location by dividing the total amount of the gas into predetermined ratio (herein after may be referred to as "dividing method"). The dividing method reduces the total oxygen containing gas supply amount compared with the supply amount of the non-dividing method. Thereby activated carbon can be prevented from being combusted and the wet oxidation enjoys improved catalytic activity. In the treatment with dividing method, the present inventive catalyst manifests satisfactory durability and treats the waste water with high satiability for a long period. When utilizing the dividing method, the oxygen containing gas can be supplied at any location and recommended are supplying the oxygen containing gas at least from the upstream of the catalyst bed entrance and from the midway of the catalyst bed. The supply amount at each location is not specifically limited but the concentration of the oxygen at the supply means for supplying the oxygen containing gas to the midway of the catalyst bed is preferably in the range from 0 to 5 vol % and more preferably from 0 to 3 vol %. With the decrease in oxygen concentration, the catalyst manifests satisfactory durability for a long period.

Further more, when utilizing the dividing method, the amount of the oxygen containing gas supplied to the midway of the catalyst bed can be predetermined by measuring the concentration of the oxygen in the gas which is to be supplied. The concentration of the oxygen may be different from the concentration at each gas supplying location.

The term "oxidation/decomposition treatment" includes variety of oxidation and/or decomposition of substances contained in the waste water such as decomposing easily decomposable substances into nitrogen gas, carbon dioxide gas, water and ash content; and oxidizing/decomposing hard to decomposable substances such as organic compounds and nitrogen compounds into low molecular weight compounds. More specifically, oxidizing/decomposing acetic acid into water and carbon dioxide; decarboxylation/decomposition of acetic acid into carbon dioxide and methane, hydrolysis of urea into ammonia and carbon dioxide; oxidizing/decomposing ammonia and hydrazine into nitrogen gas and water; oxidizing/decomposing dimethyl sulfoxide into carbon dioxide, water, and ash content such as sulphate ion; oxidizing dimethyl sulfoxide into dimethyl sulfone and methane sulfoxide are exemplified.

According to the present inventive method, the activated carbon may suffer decrease in mechanical strength and the activated carbon may be liable to be combusted by passing the water having temperature of 50° C. or more through the catalyst bed with the supply of oxygen containing gas. And thus obtained catalyst may exhibit insufficient catalytic activity for treating the waste water. For obtaining sufficient catalytic activity and the durability of the catalyst even if the temperature of the reactor exceeds 50° C. at the time of starting up the wet oxidation operation and at the time suspending the operation, supplying or circulating a liquid containing oxidizable substances is recommended and the liquid is preferably exchanged with waste water before the temperature reaches 50° C.

The treated water may be given an aftertreatment by the conventional purifying method.

The oxidizable substances such as organic acid (e.g. acetic acid) and ammonia contained in the treated water can be treated by using reverse osmosis membrane having high salt rejection rate (e.g. polyamide type composite membrane). The reverse osmosis membrane is able to remove oxidizable substances from the treated water, and thus obtained permeated liquid is highly purified. Impermeated liquid contains concentrated oxidizable substances and which can be purified by the conventional purifying method or by recycling to the wet oxidation treatment.

According to the present invention, the durability of the catalyst can be increased by packing the present inventive catalyst into plurality of containers when charging the catalyst in the reactor and/or when taking out the catalyst from the reactor. In the method for treating the waste water by catalytic wet oxidation, catalytic reaction is facilitated excessively at the catalyst bed entrance compared with the catalytic reaction at the catalyst bed exit. At the catalyst bed entrance, hotspot (overheat) may be generated by the excessive catalytic reaction and the catalyst may suffer a decrease in its durability. By employing the plurality of containers for charging the catalyst in the reactor, all the catalyst charged in the reactor does not need to be exchanged with new set of catalyst. The plurality of containers ease the catalyst exchanging process and prolong the life span of the catalyst.

According to the present inventive waste water treatment method, fluidized bed can be employed as the catalyst bed in the reactor. The catalyst containing activated carbon enables to employ the fluidized bed easily, which lowers the possibility of generating the hotspot, compared with the fixed catalyst bed. The fluidized bed is preferably employed for treating the waste water having high oxidizable substance concentration compared with the treatment utilizing fixed bed. The wet oxidation employing the fluidized bed can treat the waste water containing certain substances which may lower the durability of the catalyst while replacing deteriorated catalyst with new catalyst. On the contrary, in the wet oxidation using fixed catalyst bed, catalytic activity may be deteriorated due to the fact that the active ingredient of the catalyst moves to the rear side of the catalyst bed. The wet oxidation employing fluidized bed can solve the problem reside in the conventional wet oxidation by moving the catalyst itself. The wet oxidation employing fluidized bed can adopt the catalyst having smaller particle diameter compared with the conventional fixed catalyst bed. The wet oxidation with the catalyst having smaller particle diameter enjoys increased gas-liquid contact rate and treats the waste water with high efficiency. Further more, the wet oxidation employing fluidized bed enables to treat the waste water containing small amount of solid matter which is hardly treated in the fixed bed wet oxidation due to reactor clogging problem. The wet oxidation employing the fluidized bed can treat wide variety of waste water.

The number of the reactor employed for the wet oxidation is not specifically limited when employing the fluidized bed but considering the operational easiness and the operational cost, utilizing one reactor with fluidized bed is recommended. The type of the reactor is not specifically limited but the vessel type of the reactor may be a reactor having single room for the treatment or a reactor having multiple rooms for the treatment such as a reactor having baffle plates. The reactor having multiple rooms excels in wet oxidation performance and in operation control.

As the waste water to be treated in the wet oxidation according to the present invention, any waste water that contains organic compounds and/or nitrogen compounds can be treated, and for example, waste water discharged from various industrial plants such as chemical plants, electronic parts, manufacturing plants, food processing plants, metal processing plants, plating plants, printing plate making plants, photographic processing plants, electric power plants (e.g. heat power plants and atomic power plants) can be used. To be more specific, waste water discharged from electrooculography (EOG) manufacturing plants and alcohol production plants such as methanol, ethanol, and higher alcohol is exemplified. Especially, waste water containing organic compounds such as discharged from production plants of aliphatic carboxylic acids (e.g. acrylic acid, acrylic ester, methacrylic acid, methacrylic ester or esters thereof), aromatic carboxylic acids (e.g. terephthalic acid and terephthalic ester and aromatic carboxylic acid esters). It also may be waste water containing nitrogen compounds such as amine, imine, ammonia and hydrazine, or waste water containing sulfur compounds such as thiosulfuric acid ion, sulfide ion and dimethyl sulfoxide.

Further more, waste water can be domestic waste water such as sewage and excrements can be used. In addition, it may be waste water containing organic halogenated compounds and environmental hormones such as dioxins, flons, diethyl hexyl phthalate, and nonyl phenol.

The pH value of the waste water to be treated is not specifically limited and can be suitably adjusted as long as the pH value is in the range from 1 to 14.

The deterioration of the catalytic activity of the present inventive catalyst can be suppressed effectively by supplying catalyst protection liquid which contains easily decomposable substances at the time of temperature rising when starting up a operation of the wet oxidation and/or at the time of temperature lowering when suspending the operation. The catalyst protection liquid needs to be supplied to the catalyst bed directly or indirectly and the preferably supplying the enough amount of the catalyst protection liquid so as to the easily decomposable substances in the protection liquid is remained in the liquid passed through the catalyst bed.

The oxygen may exist in the form of adsorbed state to the catalyst or in the gaseous phase inside the catalyst bed. Even at low temperature the oxygen in the catalyst bed is consumed by oxidizing/decomposing the easily decomposable substances. Thus the catalyst bed becomes oxygen deficiency state. The oxygen deficiency state in the catalyst bed prevents the catalyst from being combusted and the catalytic activity from being deteriorated.

Existence of the catalyst protection liquid may prevent the catalyst from deterioration of its durability caused by the heat. After pre-heating the wet oxidation unit, the protection liquid is exchanged with the waste water to be treated before starting up the wet oxidation operation. If the protection liquid is remained in the catalyst bed before starting up the operation, initial reaction of the wet oxidation is facilitated.

If the catalyst bed is free from the protection liquid at the time of starting up the wet oxidation operation, the catalyst may be liable to be combusted due to excessive oxygen whereby the waste water treatment may suffer incomplete purification of the waste water at the initial stage thereof.

If the waste water is exchanged with the protection liquid at the time of suspending the wet oxidation operation, the waste water treatment enjoys complete purification of the waste water at the end of the operation and thus obtained highly purified waste water contains almost no harmful substances contained in the waste water. Further more, if the wet oxidation operation is suspended without exchanging the waste water with the protection liquid, the activity of the catalyst may be decreased, and the oxidizable substances are not fully decomposed at the end of the operation, furthermore, the waste water treatment at the beginning of the following wet oxidation operation may be deteriorated.

The deterioration of the catalytic activity can be suppressed by increasing the contact rate of the catalyst with the easily decomposable substances throughout the catalyst bed even if insufficient amount of the protection liquid is remained at the exit of the catalyst bed. The deterioration of the catalytic activity can be suppressed without protecting all the catalyst in the catalyst bed if the amount of oxygen remained at the end half of the catalyst bed, where the easily decomposable substances are diminished, is in small quantity.

The method for protecting the catalyst is applied to the wet oxidation operation at the time of temperature rising when starting up the operation and/or at the time of temperature lowering when suspending the operation. And also aforementioned catalyst protecting method can be applied when maintaining the temperature of the wet oxidation unit (e.g. reactor) during which the waste water is not supplied to the reactor. Accordingly the term "starting up the operation and suspending the operation" includes the time "maintaining the temperature of the wet oxidation".

In the aforementioned catalyst protecting method, the temperature at which the protection liquid is supplied has no particular restriction but considering the object of the inventive protection method, the liquid is preferably supplied to the heated catalyst bed. Especially, the catalyst protection method is to protect the catalyst at the time of temperature rising when starting up the operation and/or at the time of temperature low ring when suspending the operation. In this case, the temperature of supplying the protection liquid is lower than the temperature of treating the waste water. The protection liquid is preferably supplied before the temperature reached at 50° C., and more preferably at 60° C. When the temperature is lower than the temperature at which waste water is treated within 5° C., the protection liquid is preferably exchanged with the waste water. Therefore the protection liquid is preferably supplied before the temperature reached at 50° C., and more preferably at 60° C. when starting up the operation with pre-heating the unit. Also, the waste water is preferably exchanged with the protection liquid shortly after suspending the operation and the protection liquid is preferably supplied continuously until the temperature decreased to 50° C. or less and more preferably 60° C. or less.

The same pressure value for treating the waste water is preferably applicable as the pressure for supplying the protection liquid as long as the protection liquid maintains its liquid phase.

According to the inventive catalyst protection method, the protection liquid can be supplied without supplying oxygen containing gas to the catalyst bed at a time when starting up the operation and/or when suspending the operation. The pressure may be difficult to control without the presence of the gas and the unstable pressure may brought adverse effect on the catalyst. By supplying the gas from downstream of the catalyst bed; the pressure inside the reactor can be maintained and the stable pressure control can be attained. With utilizing this technique, the deterioration of the catalytic activity is efficiently suppressed since oxygen is not provided to the catalyst bed. The gas used for treating waste water such as oxygen containing gas is preferably employed as a gas for the protective method in view of the economic efficiency and the operational easiness.

After suspending the operation and during storage of the catalyst, it is preferable to keep the catalyst in the low oxygen concentration atmosphere. When the catalyst is kept in the reactor after suspending the operation, decreasing the oxygen concentration in the reactor is recommended. And more preferably, with the decrease of oxygen concentration, the protection liquid is present in the reactor.

The liquid to be used as the protection liquid is not specifically limited as long as the liquid contains easily decomposable substances. The easily decomposable substances herein means the substances which can be easily oxidized/decomposed by the present inventive catalytic wet oxidation at temperatures in the range from 50° C. to less than 170° C., preferably in the range of form 50° C. to less than 140° C. more preferably in the range from 50° C. to less than 120° C., further preferably in the range from 50° C., to less than 100° C. and most preferably in the range form 50° C. to less than 90° C.

And also the pH value of the protection liquid is preferably in the neutral zone. If the pH value of the liquid is acidic or alkaline zone, a problem of corrosion and deterioration of the unit or the catalyst may be occurred. As the protection liquid, liquid containing alcohol is preferably employed. Specifically, the liquid may contains alcohol such as methanol, ethanol, and propanol and also the liquid may contains glycol or glycerine. For obtaining better result the liquid is desired to be decomposed easily by the above mentioned condition, such as alcohol having 1 to 4 carbon atoms per molecule are preferably used, more preferably methanol, ethanol, and propanol, and most preferably methanol. The waste water containing methanol can be treated in the present inventive method and the waste water to which methanol is added can be treated. It should be noted that the protection liquid is not intended to limit to the above exemplified liquid and variety of liquid containing easily decomposable substances. As further examples, organic compounds such as acetaldehyde, formaldehyde, acetone, tetrahydrofuran, phenol and formic acid; also inorganic compounds such as sodium sulfite, sodium hydrogen sulfite can be counted as easily decomposable substances.

The concentration of the protection liquid, which is to be supplied, is not specifically limited but the concentration in terms of COD (Cr) is preferably in the range from 0.1 to 50 g/L, and more preferable lower limit is 0.5 g/L and more preferable upper limit is 30 g/L. If the concentration is less than 0.1 g/L, the catalyst protecting effect brought by the protection liquid may be decreased. If the concentration excels 50 g/L, the treatment may incur heavy cost with the increase of the oxidizable substances in the protection liquid.

Also the concentration of the protection liquid after passed through the catalyst bed is not specifically limited but the protecting effect brought by the protection liquid is increased if the oxidizable substances in the protection liquid is remained in the liquid passed through the catalyst bed. The preferable concentration of the oxidizable substances in the liquid passed thorough the catalyst bed is in the range from 0.05 to 50 g (COD (Cr)), more preferable lower limit is 0.1 g/L, and more preferable upper limit is 30 g/L. If the concentration is less than 0.05 g/L, the catalyst protecting effect may be decreased. If the concentration excels 50 g/L, the treatment may incur heavy cost and aftertreatment of the liquid may be needed.

The method of supplying the protection liquid at the time when starting-up the operation with pre-heating the unit is not specifically limited. Easily oxidizable substances dissolved in water may be supplied to the wet oxidation unit directly via pump (e.g. pump 5 in FIG. 1) or may be added to waste water in the waste water reserve tank (not shown) and supplying thus easily oxidizable substances added waste water to the wet oxidation unit. The method of supplying the protection liquid at the time when suspending the operation with cooling down the unit is not specifically limited the easily oxidizable substances dissolved in water may be supplied to the wet oxidation unit via the pump 5 shortly after suspending the supply of the waste water. The protection liquid can be supplied from the upstream of the wet oxidation unit via another pump which is different from the pump used for feeding the waste water.

The space velocity at the catalyst bed (namely passing rate of the protection liquid through the catalyst bed) is not specifically limited, and the same condition with the space velocity for treating waste water can be applicable. The space velocity (LHSV) at the catalyst bed is preferably in the range from 0.1 hr$^{-1}$ to 10 hr$^{-1}$, more preferably from 0.1 hr$^{-1}$ to 5 hr$^{-1}$, and most preferably from 0.1 hr$^{-1}$ to 3 hr$^{-1}$. If the space velocity is less than 0.1 hr$^{-1}$, excessive time, which is commercially unacceptable, may be needed for obtaining sufficient protecting effect. If the space velocity exceeds 10 hr$^{-1}$, large amount of the protection liquid may be needed for obtaining sufficient protecting effect.

Spent protection liquid may contains easily decomposable substances. When spent protection liquid contains easily decomposable substances, the spent protection liquid may be given an aftertreatment such as conventional purifying method (e.g. biological treatment and chemical treatment) before dumping. As an aftertreatment, the spent protection liquid can be treated with/without the waste water by the present inventive wet oxidation by adding to the waste water reserve tank. The spent protection liquid can be reused as a protection liquid.

When starting-up the operation with pre-heating the unit and/or when suspending the operation with cooling down the unit, the concentration of oxygen in the exhaust gas (a gas passed through the catalyst bed) is preferably maintained in the range from 0 to 5 vol %. The oxidation concentration in this range suppresses the deterioration of the catalytic activity and gives an effective protecting effect at the time of temperature rising when starting up a operation and/or at the time of temperature lowering when suspending the operation. If the concentration exceeds 5 vol %, the activated carbon may be liable to be conbusted by oversupplied oxygen. Accordingly the wet-oxydation is preferably conducted with supplying enough oxygen for oxdizing/decomposing the oxydizable substances. The closer to 0 vol % of the oxygen concenarion, the better protecting effect can be obtained. The most preferable lower limit is 0 vol %. Also, preferable upper limit of the concentration is 4 vol %, more preferably 2 vol % and most preferably 1 vol %. If the pressure of the unit can maintains at certain level needed for operating the wet oxidation, less amount of oxygen is preferably supplied for surpressing the degradation of the catalytic activity. It should be noted that if the oxygen containing gas is under supplied, difficulty may arise when the protection liquid is exchanged with the waste water at the time starting-up the operation. And in this case, the treatment of the oxidizable substances in the waste water will be effected with unduly low efficiency and the purification of the waste water may be attained incompletely.

If the temperature at which the protection liquid is supplied is unduly low compared with the catalyst bed temperature at which the waste water is treated when starting-up the operation and/or when suspending the operation, the radical deterioration of the catalytic activity is surprised even if oxygen is present in the catalyst bed. Therefore when the temperature is less than 50° C., and in most cases less than 60° C., the oxygen concentration in the exhaust gas can exceed 5 vol % and the catalyst bed can be free from the protection liquid. If the temperature at which the waste water is treated exceeds 90%, the oxygen concentration in the exhaust gas can exceed 5 vol % without deteriorating the catalytic activity within short period (i.e. within 24 hours, more preferably 12 hours) at the temperature in the range from 50° C. to less than 80° C. under the condition that the protection liquid is existed in the catalyst bed.

The concentration of oxygen can be suitably adjusted within above mentioned range with variety of method, for example the concentration meter 16 can be employed for measuring the concentration of the oxygen in the exhaust gas and the oxygen supply amount can be controlled by valve 9 based on the result obtained from the concentration meter 16. And aforementioned concentration meter can be employed.

The term "oxygen concentration in the exhaust gas" herein means the oxygen concentration in the gas phase passed through the catalyst bed when starting-up the operation and/or suspending the operation. In general, the oxygen concentration is obtained by measuring the oxygen concentration in the gas-liquid separator as shown in FIG. 1

The catalyst protection treatment can be conducted with/ without supplying oxygen containing gas. Small amount of the oxygen containing gas is preferably supplied when operating the catalyst protection treatment. In general, the waste water treatment is operated with the application of pressure, the pressure inside the reactor need to be maintained to some extent when starting-up the operation and/or when suspending the operation. Supplying small amount of gas is recommended for maintaining the pressure stably.

In stead of the oxygen containing gas, oxygen free gas such as nitrogen gas and inert gas can be employed. The oxygen containing gas used for treating waste water is preferably employed for economic efficiency and for process easiness.

The oxygen concentration in the exhaust gas during the protecting treatment is preferably in the range of form 0 to 5 vol %. The preferable condition for controlling the oxygen concentration within the rang from 0 to 5 vol % is to set [oxygen amount in the gas supplied]/[oxygen demand in the protection liquid at maximum catalyst protecting efficiency] (hereinafter may be referred to as "D1 value")=0 to 1.3. The deterioration of the catalytic activity can be remarkably suppressed by controlling the oxygen supply amount to the aforementioned D1 value. And also, it is preferable to control the protection liquid supply amount so as to easily decomposable substances are remained in the liquid passed through the catalyst bed. If the D1 value=1.0 to 1.3, the easily decomposable substances may not be remained in the liquid passed through the catalyst bed. If the D1 value exceeds 1.0, especially exceeds 1.3, the oxygen supply amount may be increased for oxidizing/decomposing the easily decomposable substances contained in the protection liquid and also the activated carbon may be liable to be combusted by the oversupplied oxygen. For avoiding these problems, preferable upper limit is 0.8, more preferably 0.6 and most preferably 0.4.

[oxygen demand in the protection liquid at maximum catalyst protecting efficiency] is measured by changing the oxygen containing gas supply amount under the fixed condition of the temperature, pressure, LHSV, gas-liquid current type, and the catalyst. In other words. [oxygen demand in the protection liquid at maximum catalyst protecting efficiency] means required oxygen amount of the protection liquid when the protection treatment efficiency rate indicates its maximum efficiency rate under above condition. The D1 value can be used as an index for indicating excess and deficiency of the oxygen supply amount. The maximum catalyst protecting efficiency is changed with the change in temperature according to the present invention. The highest temperature of supplying the protection liquid is employed for measuring the D1 value. According to the present invention, the higher the temperature, the better the catalyst protecting efficiency is obtained. The D1 value can be used as an index for indicating excessive rate of oxygen supply amount when conducting the catalyst protecting treatment. The concept of D1 value is the same as the concept of aforementioned D value.

According to the present inventive method, oxidation/ decomposition performance deteriorated catalyst can be recovered efficiently by supplying a catalyst recovering liquid which contains easily decomposable substances under temperatures in the range from 55° C. to less than 200° C.

For recovering the deteriorated catalyst, supplying the recovering liquid containing easily decomposable substances to the catalyst bed is needed according to the present invention. And the supply amount of the recovering liquid is preferably controlled so as to the easily oxidizable substances in the liquid are remained in the liquid passed through the catalyst bed. The deterioration of the catalytic activity is caused by the following reason.

1) The catalyst, especially activated carbon is liable to be oxidized by oxygen existed in the form of adsorbed state to the catalyst or in the gas phase inside the catalyst bed.
2) The catalytic activity is deteriorated by being covered its active site by hard to decompose oxidizable substances contained in the waste water when conducting the waste water treatment for a long period.

According to the present inventive catalyst recovering method, the catalyst property can be modified by contacting the recovering liquid with the catalyst. And also the recovering liquid exhibits the effect of removing adsorbed substances from the active site easily. To be more specific, the recovering liquid is decomposed by heat and thus obtained heat decomposed substances of the recovering liquid facilitates desorping the adsorbed substances from the active site by decomposing the adsorbed substances thereof under the oxygen deficiency condition or without supplying oxygen containing gas. And also, easily decomposed substances in the recovering liquid is readily oxidized with the supply of oxygen containing gas and the oxidation readiness property of the recovering liquid facilitates the catalytic reaction. With the oxidation of the substances in the recovering liquid, the hard to decomposed substances adsorbed to the catalyst is easily oxidized/decomposed and removed form the active site. For improving the aforementioned effect, the supply amount of the recovering liquid is preferably controlled so as to the easily oxidizable substances in recovering liquid are remained in the liquid passed through the catalyst bed. If the easily oxidizable substances are not remained in the liquid passed through the catalyst bed, aforementioned effect may not be attained. By employing the present inventive catalyst recovering method, the catalytic activity is protected by the recovering liquid from deterioration when conducting the catalyst recovering process under high temperature. With the present inventive recovering method, the catalytic activity is improved by the recovering liquid.

The catalytic activity can be recovered to a certain level by contacting the recovering liquid with the most part of the catalyst bed even if the easily oxidizable substances do not remain in the liquid passed through the catalyst bed. It should be noted that all the catalyst in the catalyst bed dose not need to be recovered for improving the waste water treatment efficiency. The waste water treatment efficiency can be improved by recovering the enough amount of the catalyst to meet the supply amount of the easily decomposable substances in the waste water.

The liquid to be used as the recovering liquid is not specifically limited as long as the liquid contains easily decomposable substances. The liquid used for protection liquid can be preferably used as the recovering liquid.

The concentration of the recovering liquid, which is to be supplied, and the concentration of the recovering liquid after passed through the catalyst bed is not specifically limited. The concentration of aforementioned protection liquid is preferably applied to the concentration of the recovering liquid.

The method of supplying the recovering liquid and the aftertreatment of spent recovering liquid are not specifically limited and aforementioned protection liquid supply method and spent protection liquid aftertreatment are preferably applied.

And the recovering operation can be conducted with/without supplying oxygen containing gas. The condition of aforementioned protecting operation is preferably applied to the recovering operation.

The oxygen concentration in the exhaust gas during the recovering operation is preferably in the range form 0 to 5 vol %. The preferable condition for adjusting the oxygen concentration in the rang from 0 to 5 vol % is to set [oxygen amount in the gas supplied]/[oxygen demand in the recovering liquid at maximum catalyst recovering efficiency] (hereinafter may be referred to as "D2 value")=0 to 1.3. The regenerating effect can be improved by adjusting the oxygen supply amount to the aforementioned D2 value.

According to the recovering operation, if the D2 value= 1.0 to 1.3, the easily decomposable substances may not be remained in the liquid passed through the catalyst bed. If the D2 value exceeds 1.0, and especially exceeds 1.3, the oxygen supply amount is increased for oxidizing/decomposing the easily decomposable substances contained in the recovering liquid and also the activated carbon may be liable to be combusted by the oversupplied oxygen. For avoiding these problems, the preferable upper limit is 0.8, more preferably 0.6 and most preferably 0.4. It should be noted that excess amount of oxygen may be required for decomposing the oxidizable substances adsorbed to the activated carbon which is formed during the long period of waste water treatment operation. Therefore it is effective to change the oxygen supply amount during the recovering operation. Namely, at the initial stage of the recovering operation, adjusting the oxygen supply amount to obtain D2=1.0 to 1.3 is recommended. And at the end stage of the recovering operation, adjusting the oxygen supply amount to obtain D2=0 to 1.0, preferably D2=0 to 0.8, and more preferably D2=0 to 0.4 is recommend d.

The [oxygen demand in the recovering liquid at maximum catalyst recovering efficiency] is measured by changing the oxygen containing gas supply amount under the fixed condition of the temperature, the pressure, LHSV, gas-liquid current type, and the catalyst. In other words, [oxygen demand in the recovering liquid at maximum catalyst recovering efficiency] means required oxygen amount of the recovering liquid when the recovering treatment efficiency rate indicates its maximum efficiency rate under above condition. The maximum catalyst recovering efficiency may not be changed with the change in temperature according to the present invention if the most oxidizable substances contained in the recovering liquid are easily oxidizable substance. If this is the case, the recovering efficiency rate is changed in accordance with the oxygen supply amount. That is, when the oxygen supply amount is constant, D2 value may not be changed even if the temperature is changed. The D2 value can be used as an index for indicating excessive amount rate of the oxygen supply amount. The concept of D2 value is the same as the concept of aforementioned D and D1 value.

The temperature of supplying the recovering liquid is preferably higher than the temperature at which waste water is treated about from 5 to 100° C., preferably from 10 to 60° C., and more preferably 15 to 40° C. It should be noted that the operation is conducted less than 200° C. If the temperature exceeds 200° C., activated carbon may be liable to be combusted and the catalyst may suffer a decrease in catalytic activity. Accordingly preferable upper limit is at 170° C., more preferably at 160° C. and most preferably at 150° C.

The heat treatment time is not specifically limited. The heat treatment may be conducted about from 1 to 100 hours, preferably from 3 to 50 hours, and more preferably from 5 to 24 hours.

And also for recovering the catalyst containing (a) component and (b) component, reduction treatment can be applied to the catalyst at higher temperature than the temperature mentioned above. To be more specific, reduction treatment can be conducted under oxygen containing gas deficiency state or without supplying oxygen containing gas at the temperature less than 300° C.

The recovering operation may need to be conducted at high temperature for decomposing the oxidizable substances adsorbed to the activated carbon which is formed during the long period of waste water treatment operation. Therefore it is effective to change the temperature within above mentioned recovering operation temperature during the recovering operation.

Namely, preferably 20 to 100° C., more preferably 25 to 80° C. and most preferably 30 to 60° C. added temperature to the temperature at which waste water is treated is preferably employed at the initial stage of the recovering operation as long as the temperature remains above mentioned recovering operation temperature and the temperature at the end stage of the recovering operation is preferably selected in the range from lower than the temperature at the initial stage of the recovering operation. And most preferably selected in the range from higher than the temperature at which waste water is treated and lower than the temperature at the initial stage of the recovering operation. It has no particular restriction except for the requirement that the sufficient pressure is applied for enabling the recovering liquid to retain the liquid phase thereof.

Hereinafter, the present invention will be further illustrated in detail with reference to several inventive examples and comparative examples below, which are not directed to limiting the scope of the invention.

EXAMPLES

Example 1 to 5

500 hours of waste water treatment was performed under the following conditions with using the equipment illustrated in FIG. 1. A reactor 1 having cylindrical shape (a diameter of 26 mmφ and a length of 3000 mm) was used in the treatment. Into the reactor, loaded were 1 liter (380 g) of pellet type solid catalysts having a diameter of 4 mm φ to give a catalyst bed height of 1880 mmH. The solid catalyst had activated carbon and platinum as main components and included 0.3 mass % of platinum with respect to the total amount of the solid catalyst. In addition, as the waste water to be treated in the present examples, used was waste water exhausted by manufacturing facilities of aliphatic carboxylic acids and aliphatic carboxylate. The waste water contained organic compounds having 2 or more carbon atoms per molecule such as alcohol, aldehyde and carboxylic acid. The COD (Cr) concentration of the waste water was 20000 mg/liter and pH thereof equaled 2.8. In addition, 55% of the total TOC component was acetic acid. This waste water did not include any of alkali metal ion, ammonium ion and inorganic salt.

The aforementioned waste water was fed with pressure rising by waste water feed pump 5 at the flow rate of 1 liter/h. Subsequently, the waste water was heated up to 120° C. by heater 3 and then supplied to reactor 1 from its upside to make a gas-liquid downward concurrent flow for the treatment. Air was also introduced through oxygen-containing gas supply line 8, followed by being compressed by compressor 7. The oxygen-containing gas (air) was then supplied to the waste water according to the ratios shown in table 1 prior to the waste water was heated by to heater 3.

In reactor 1, the waste water temperature was maintained to be 120° C. by electric heater 2 to perform oxidation/decomposition treatments. The obtained treated water was cooled to 30° C. by cooler 4. Subsequently, it was exhausted through pressure control valve 12 with its pressure being recovered, followed by separating gas from liquid in the exhausted water by gas-liquid separator 11. In this process, at pressure control valve 12, pressure controller PC detected and controlled the pressure in reactor 1 to keep the pressure at 0.5 MPa (Gauge). In addition, oxygen concentration of the exhaust gas in gas-liquid separator 11 was measured by using oxygen content meter 16. The COD (Cr) concentration of the treated water in gas-liquid separator 11 was also measured. On temperature rising in reactor 1, the waste water was supplied to reactor 1 under the condition of oxygen deficiency in order to suppress deterioration of the catalyst therein.

The results were shown in table 1. In examples 2 to 5, the waste water treatments was continued for evaluation of the catalyst durability even after the treatment time reached 500 hours and then about 5000-hour endurance test were conducted. After 5000-hour treatment, the catalyst was extracted from the reactor to be observed. As a result, it was found that any catalyst in these examples stayed unchanged after the treatments.

Example 6

The treatment was performed in the same manner including the same catalyst, treatment processes, treatment conditions and equipment as in example 4, except that the treatment temperature was set to 140° C. This result was also shown in table 1. In addition, after 5000-hour treatment, the catalyst was extracted from the reactor to be observed. As a result, it was found that the catalyst in this experiment stayed unchanged after the treatment.

Example 7

The treatment was performed in the same manner including the same catalyst, treatment processes, treatment conditions and equipment as in example 1 except for the following 3 points: 1) the treatment temperature was set to 95° C.; 2) the treatment pressure was set to the atmosphere pressure; and 3) the supply amount of oxygen-containing gas was adjusted to 0.40 in term of $O_2/COD$. This result was also shown in table 1. In addition, after 5000-hour treatment, the catalyst was extracted from the reactor to be observed. As a result, it was found that the catalyst in this experiment stayed unchanged after the treatment.

TABLE 1

|  | $O_2$/COD | D Value | COD(Cr) Treatment Efficiency After 500 Hour Treatment (%) | Oxygen Concentration In Exhaust Gas (vol %) | COD(Cr) Treatment Efficiency After 5000 Hour Treatment (%) |
| --- | --- | --- | --- | --- | --- |
| Example 1 | 0.75 | 0.79 | 77 | 0 | — |
| Example 2 | 0.85 | 0.89 | 86 | 0 | 86 |
| Example 3 | 0.95 | 1.00 | 95 | 0.2 | 95 |
| Example 4 | 1.00 | 1.05 | 93 | 1.5 | 92 |
| Example 5 | 1.10 | 1.15 | 93 | 3.5 | 90 |
| Example 6 | 1.00 | 1.00 | 99.8 | 0 | 94 |
| Example 7 | 0.40 | 1.03 | 39 | 0.5 | 39 |

Comparative Example 1

The treatment was performed in the same manner including the same catalyst, treatment processes, treatment conditions and equipment as in example 3, except for setting the treatment temperature to 200° C. and the treatment pressure to 3 MPa (Gauge). In this treatment, the supply amount of oxygen-containing gas was adjusted to satisfy $O_2/COD=0.95$ and D value=0.95 (that is, in case of $O_2/COD=1.0$, the initial COD (Cr) treatment efficiency under the treatment conditions equaled to 100%).

Consequently, the COD (Cr) treatment efficiency after 100-hour treatment was 95% and the oxygen concentration in the exhaust gas was 0 vol %. This waste water treatment was continued for evaluation of the catalyst durability. As a result, after about 450-hour treatment, it was observed that the catalyst was flowing out along with the treated water through the liquid vent of the wet oxidation treatment equipment. The pressure rising was also observed according to the pressure gauge indicator PI that was provided on the gas-liquid inlet side of reactor 1. For these reasons, the treatment was stopped to extract the catalyst from the reactor. Consequently, it was observed over the catalyst bed that the catalyst had lost its shape and the amount thereof had decreased.

Comparative Example 2

The treatment was performed in the same manner including the same catalyst, treatment processes, treatment conditions and equipment as in example 1, except that the supply amount of oxygen-containing gas was adjusted to satisfy. $O_2/COD=1.5$ and D value=1.6.

Consequently, the COD (Cr) treatment efficiency after 100-hour treatment was 86% and the oxygen concentration in the exhaust gas was 9.5 vol %. This waste water treatment was continued for evaluation of the catalyst durability. As a result, the COD (Cr) treatment efficiency after 500-hour treatment was 30%. Therefore, the treatment was stopped to extract the catalyst from the reactor. Consequently, it was observed over the catalyst bed that the catalyst had lost its shape and the amount thereof had decreased.

Example 8

The treatment was performed in the same manner including the same catalyst, treatment processes, treatment conditions and equipment as in example 1, except that the supply amount of oxygen-containing gas was adjusted to satisfy $O_2/COD=0.2$ and D value=0.21.

Consequently, the COD (Cr) treatment efficiency after 100-hour treatment was 20% and the oxygen concentration in the exhaust gas was 0 vol %. This waste water treatment was continued for evaluation of the catalyst durability. As a result, the COD (Cr) treatment efficiency after 500-hour treatment was 20%.

In this example, the treatment efficiency was low resulting from oxygen deficiency due to such a small supply amount of oxygen containing gas. However, the catalyst deterioration was not observed. In addition, after this treatment, the oxygen containing gas supply amount was increased to the same amount as that in example 3. This resulted in 95% of COD (Cr) treatment efficiency of the waste water.

Comparative Example 3

The treatment was performed in the same manner including the same catalyst, treatment processes, treatment conditions and equipment as in example 7, except that the supply amount of oxygen-containing gas was adjusted to satisfy $O_2/COD=2.0$ and D value=5.1.

Consequently, the COD (Cr) treatment efficiency after 100-hour treatment was 39%. This waste water treatment was continued for evaluation of the catalyst durability. As a result, the COD (Cr) treatment efficiency after 1500-hour treatment was 27%. Therefore, the treatment was stopped to extract the catalyst from the reactor. Consequently, it was observed over the catalyst bed that the catalyst had lost its shape and the amount thereof had decreased.

Example 9

A 500-hour treatment was performed under the following conditions with using the equipment illustrated in FIG. 2. In the treatment, reactor 21 had a cylindrical shape having a diameter of 26 mmφ and a length of 3000 mm. Into the reactor, loaded were 1 liter (380 g) of the same pellet type solid catalysts as the one used in example 1 to give a catalyst bed height of 1880 mmH. In addition, the same waste water as the one used in example 1 was treated in the present example. Moreover, the same treatment processes as the ones in example 3 were applied in the present example, except that the supply port, through which the waste water heated by heater 3 was supplied to reactor 21, was provided on the bottom of reactor 21 and thereby the waste water treatment was conducted in the state of gas-liquid upward concurrent flow. In addition, the supply amount of oxygen-containing gas was adjusted to satisfy $O_2/COD=0.95$ and D value=1.12. Furthermore, the maximum efficiency for treating the waste water was given when the oxygen-containing gas was supplied with satisfying $O_2/COD=2.0$ as described in comparative example 4. The treatment efficiency of COD (Cr) in this case was 85%.

Consequently, the COD (Cr) treatment efficiencies after 100-hour and 500-hour treatments were 75% and the oxygen concentrations in the exhaust gas were both 4.5 vol %. This waste water treatment was continued for evaluation of the catalyst durability even after the 500-hour treatment. Then about 2500-hour endurance test were conducted, resulting in 69% of COD (Cr) treatment efficiency. During the test, the oxygen concentration of exhaust gas was gradually rising. The supply amount of air was therefore reduced little by little to keep the oxygen concentration of the exhaust gas at 4.5 vol %.

Comparative Example 4

The treatment was performed in the same manner including the same catalyst, treatment processes, treatment conditions and equipment as in example 9, except that the supply amount of oxygen-containing gas was adjusted to satisfy $O_2/COD=2.0$ and D value=2.35. Consequently, the COD (Cr) treatment efficiency after 100-hour treatment was 85% and the oxygen concentration of the exhaust gas was 12 vol %. This waste water treatment was continued for evaluation of the catalyst durability. As a result, the COD (Cr) treatment efficiency after 500-hour treatment was 30%. Therefore, the treatment was stopped to extract the catalyst from the reactor. Consequently, it was observed over the catalyst bed that the catalyst had lost its shape and the amount thereof had decreased.

Comparative Examples 5 and 6

100-Hour treatments were performed in the same manner including the same treatment processes, treatment conditions and equipment as in example 1 except for the following points: 1) 1 liter (1050 g) of pellet type solid catalysts having a diameter of 4 mm φ was loaded into reactor 1 to give a catalyst bed height of 1880 mmH; and 2) the solid catalyst had titania and platinum as main components and included 0.3 mass % of platinum. As a result, the COD (Cr) treatment efficiency was too low and, in other words, the waste water could not well-purified.

TABLE 2

|  | $O_2/COD$ | COD(Cr) Treatment Efficiency (%) | Oxygen Concentration In Exhaust Gas (vol %) |
| --- | --- | --- | --- |
| Comparative Example 5 | 0.35 | 34 | 0.7 |
| Comparative Example 6 | 1.0 | 35 | 14 |

Example 10

A 500-hour treatment was performed under the following conditions with using the equipment illustrated in FIG. 3. The equipment has a couple of front and back reactors as mentioned above and thereby it is also possible to supply oxygen containing gas through the portion between the front and back reactors. The front reactor had a cylindrical shape having a diameter of 26 mmφ and a length of 3000 mm. The back reactor was also a cylindrical shape having a diameter of 26 mmφ and a length of 3000 mm. Into each of the reactors, loaded were 1 liter of the same solid catalyst as the one used in example 1. That is, 2 liters of the catalyst was loaded totally. The treatment was performed in the same manner including the same catalyst and treatment processes as in example 3 except for setting the supply amount of the waste water to 2 liter/hour and supplying the oxygen-containing gas to the waste water in two stages as mentioned below.

In the method of supplying the oxygen-containing gas, air was introduced though oxygen-containing gas supply line 8 and compressed by compressor 7. The air was then supplied to the waste water with satisfying the ratio of $O_2/COD=0.7$ prior to the waste water was heated by to heater 3. The air was further supplied through the port between the front and back reactors with satisfying the ratio of $O_2/COD=0.27$.

Consequently, the COD (Cr) treatment efficiency after 500-hour treatment was 97% and the oxygen concentration in the exhaust gas was 0.1 vol %. This waste water treatment was continued for evaluation of the catalyst durability even after the 500-hour treatment. Then about 5000-hour endurance test was conducted. The obtained COD (Cr) treatment efficiency was also 97%. After 5000-hour treatment, the catalyst was extracted from the reactors to be observed. As a result, the catalyst was found to stay unchanged after this treatment. The D value at this point was 1.00.

Examples 11 and 12

500-Hours treatments were performed under the following conditions with using the same equipment as the one used in example 1. Into reactor 1, loaded were 1 liter (450 g) of pellet type solid catalysts having a diameter of 3 mmφ to give a catalyst bed height of 1880 mmH. The solid catalyst had activated carbon and platinum as main components and included 0.6 weight % of platinum. In addition, as the waste water to be treated in the present examples, used was waste water exhausted by electric generating plants. The waste water contained ammonium sulfate, sodium ion and carbonic acid ion. Th ammonium concentration of the waste water was 4200 mg/liter and pH thereof equaled 7.8. The treatment was performed in the same manner including the same treatment processes and same equipment as in example 1 except for setting the treatment temperature and pressure respectively to 130° C. and 0.9 MPa (Gauge) and supplying the oxygen-containing gas (air) according to the ratios shown in table 3.

The results were also shown in table 3. The waste water treatments were continued for evaluation of the catalyst durability even after the 500-hour treatments and then about 2500-hour endurance tests were conducted. After 2500-hour treatments, the catalyst was extracted from the reactors to be observed. As a result, it was found that any catalyst in these examples stayed unchanged after the treatments.

Example 13

A treatment was performed in the same manner as in example 11 except for the following points: 1) 1 liter (430 g) of pellet type solid catalysts having a diameter of 3 mm φ were loaded to give a catalyst bed height of 1880 mmH: 2) the solid catalyst had activated carbon and palladium as main components and contained 1.0 mass % of palladium. The result was also shown in table 3.

TABLE 3

|  | $O_2$/COD | D Value | Ammonia Treatment Efficiency (%) | Oxygen Concentration In Exhaust Gas (vol %) | Ammonia Treatment Efficiency After 2500 Hour Treatment (%) |
| --- | --- | --- | --- | --- | --- |
| Example 11 | 0.85 | 0.88 | 85 | 0 | 84 |
| Example 12 | 0.98 | 1.01 | 97 | 0.25 | 96 |
| Example 13 | 0.98 | 1.03 | 95 | 0.7 | 95 |

Comparative Example 7

The treatment was performed in the same manner including the same catalyst, treatment processes, treatment conditions and equipment as in example 11, except that the supply amount of oxygen-containing gas was adjusted to satisfy $O_2$/COD=1.5 and D value=1.55. Consequently, the COD (Cr) treatment efficiency after 100-hour treatment was 97% and the oxygen concentration of the exhaust gas was 8 vol %. This waste water treatment was continued for evaluation of the catalyst durability. As a result, the COD (Cr) treatment efficiency decreased to 73% after about 500-hour treatment. Therefore, the treatment was stopped to extract the catalyst from the reactor. Consequently, it was observed over the catalyst bed that the catalyst had lost its shape and the amount thereof had decreased.

Example 14

A 500-hour treatment was performed under the following conditions with using the same type of the wet oxidation treatment equipment as the one used in example 1. The equipment had cylindrical reactor 1 having a diameter of 200 mmφ and a length of 3000 mm. 60 Liters (24.6 kg) in total of pellet type solid catalysts having a diameter of 5 mm were divided into 3 cassette cases (i.e., each case has 20 liters (8.2 kg) of the catalyst) and the 3 cases of the catalyst were loaded into reactor 1. Each case had a cylindrical shape having an internal diameter of 180 mmφ and a length of 900 mm and the 3 cases were set in series in reactor. The waste water to be treated in the present example was solvent-type waste water containing a large amount of alcohols such as ethyl alcohol and propyl alcohol. The COD (Cr) concentration of the waste water was 30 g/liter and pH thereof equaled 7.1.

In addition, this waste water did not include any of alkali metal ion, ammonium ion and inorganic salt. Then the heat temperature by the heater was set to 100° C., the temperature in the reactor was kept at 130° C., the treatment pressure was set to 0.6 MPa (Gauge) and the oxygen-containing gas (oxygen-enrichment gas) was supplied to the waste water according to the following ratio. Also, the supply amount of the waste water was set to 30 liter/h. The equipment was operated in the same manner as in example 1 for the waste water treatment. As the oxygen-enrichment gas, used was gas having 30 vol % of oxygen concentration that had been manufactured from air according to an oxygen enrichment membrane apparatus. As a result, in case of supplying the oxygen-containing gas with satisfying $O_2$/COD=0.94 and D value=1.01, the COD (Cr) treatment efficiency after 100-hour treatment was 93% and the oxygen concentration in the exhaust gas was 0.25 vol %.

Subsequently, the oxygen-containing gas was supplied so as to give the supplying amount ratio of $O_2$/COD=0.92 and D value=0.99, and this treatment was continued with keeping the oxygen concentration of the exhaust gas below 0.1 vol %. As a result, the COD (Cr) treatment efficiency after 5000-hour treatment was 92%. After the 5000-hour treatment, the catalyst was extracted from the reactor to be observed. In consequence, it was found that the catalyst in the second case and the bottom case in the reactor stayed unchanged after the treatment. However, it was observed that the catalyst in the top case tended to have a slightly decreased catalyst activity.

Therefore, for further continuation of the waste water treatment, the bottom and top catalyst cases in reactor 1 were replaced with each other to perform the further treatment. As a result, the COD (Cr) treatment efficiency immediately after the replacement was 92%. The COD (Cr) treatment efficiency after further 5000-hour treatment (i.e., after 10000-hour treatment in total) was also 92%. After this treatment, the catalyst was extracted from the reactor to be observed. In consequence, it was observed that the catalyst in the cases located on the top and bottom in the reactor in the further treatment (i.e., when the treatment time was between 5000 to 10000 hours) tended to have a slightly decreased catalyst activity. However, no critical catalyst deterioration was observed.

Example 15

A 500-hour treatment was performed under the following conditions with using the same equipment as the one used in example 1. Into reactor 1, loaded were 1 liter (440 g) of pellet type solid catalysts having a diameter of 3 mmφ to give a catalyst bed height of 1880 mmH. The solid catalyst had activated carbon as main component. In addition, the waste water treated in the present example contained 1000 mg/liter of hydrazine that had exhausted by semiconductor manufacturing plants and pH of the waste water equaled 8.6. In the treatment, the treatment temperature was set to 90° C., the treatment pressure was set to the atmosphere pressure and the supply amount of the waste water was adjusted to 3 liter/h. In addition, the oxygen-containing gas (air) was supplied to the waste water in such a manner that the supplied oxygen amount equaled to the required oxygen amount for decomposition of the hydrazine and satisfied D value=1.0. The equipment was operated in the same manner as in example 1 to treat the waste water.

As a result, the hydrazine treatment efficiency after 500-hour treatment was 100% and the oxygen concentration in the exhaust gas was less than 0.1 vol %. The waste water treatment was continued for evaluation of the catalyst durability even after the 500-hour treatment and then about 5000-hour endurance test was conducted. Consequently, the hydrazine treatment efficiency in the test was 100%. Additionally, after 5000-hour treatment, the catalyst was extracted from the reactor to be observed. It was found that the catalyst stayed unchanged after the treatment.

Comparative Example 8

The treatment was performed in the same manner including the same catalyst, treatment processes, treatment conditions and equipment as in example 15, except that the supply amount of the oxygen-containing gas was adjusted in such a manner that the supplied oxygen amount was twice as large as the required oxygen amount for decomposition of the hydrazine.

As a result, the hydrazine treatment efficiency after 100-hour treatment was 100% and the oxygen concentration in the exhaust gas was 11 vol %. In addition, the waste water treatment was continued for evaluation of the catalyst durability. It resulted in the decrease of the hydrazine treatment efficiency to 88% after about 2000-hour treatment. Therefore, the treatment was stopped to extract the catalyst from the reactor. Consequently, it was observed over the catalyst bed that the catalyst had lost its shape and the amount thereof had decreased.

Examples 16 and 17

500-hour treatments were performed under the following conditions with using the equipment illustrated in FIG. 1. Into reactor 1, loaded were 1 liter (350 g) of pellet type solid catalysts having a diameter of 4 mmϕ to give a catalyst bed height of 1880 mmH. The solid catalyst had activated carbon and platinum as main components and included 0.15 weight % of platinum. In addition, the waste water to be treated in the present examples contained methanol and the COD (Cr) concentration thereof was 10000 mg/liter. Then the treatment temperature was set to 80° C. and the treatment pressure was set to the atmosphere pressure. Also, the oxygen-containing gas (air) was supplied to the waste water according to the ratios shown in table 4. The supply amount of the waste water was set to 0.5 liter/h. Moreover, the equipment was operated in the same manner as in example 1.

The results were shown in table 4. The waste water treatments were continued for evaluation of the catalyst durability even after the 500-hour treatment and then about 5000-hour endurance tests were conducted. After the 5000-hour treatment, the catalyst was extracted from the reactor to be observed. As a result, it was found that any catalyst in these examples stayed unchanged after the treatments.

TABLE 4

| | $O_2$/COD | D Value | COD(Cr) Treatment Efficiency After 500 Hour Treatment (%) | Oxygen Concentration In Exhaust Gas (vol %) | COD(Cr) Treatment Efficiency After 5000 Hour Treatment (%) |
|---|---|---|---|---|---|
| Example 16 | 0.85 | 0.89 | 85 | 0 | 84 |
| Example 17 | 0.95 | 1.00 | 95 | 0 | 95 |

Comparative Example 9

The treatment was performed in the same manner including the same catalyst, treatment processes, treatment conditions and equipment as in example 16, except that the supply amount of the oxygen-containing gas was set to satisfy $O_2$/COD=2.0 and D value=2.11. Consequently, the COD (Cr) treatment efficiency after 100-hour treatment was 85% and the oxygen concentration in the exhaust gas was 12 vol %. In addition, the waste water treatment was continued for evaluation of the catalyst durability. It resulted in the decrease of the COD (Cr) treatment efficiency to 68% after about 1000-hour treatment. Therefore, the treatment was stopped to extract the catalyst from the reactor. Consequently, it was observed over the catalyst bed that the catalyst had lost its shape and the amount thereof had decreased.

Example 18

A waste water treatment was performed with using the equipment illustrated in FIG. 1. Into the reactor 1, loaded were 1 liter (390 g) of pellet type solid catalysts having a diameter of 4 mmϕ to give a catalyst bed height of 1880 mmH. The solid catalyst had activated carbon and platinum as main components and included 0.3 weight % of platinum.

This equipment was started up according to the following processes. First of all, the catalyst protection liquid having 15000 mg/liter of COD (Cr) containing about 10 g/liter of methanol was pressurized by waste water feed pump 5 at the flow rate of 1 liter/h. Air (oxygen-containing gas) was supplied to the catalyst protection liquid prior to the protection liquid was heated by heater 3. The air supply amount was adjusted so that the aforementioned D1 value was 0.3 when the internal temperature of reactor 1 was 120° C. The heated gas-liquid mixture by heater 3 was supplied to reactor 1 from its upside to give a gas-liquid downward concurrent flow. On starting the gas-liquid supply, the internal temperature in reactor 1 was 20° C. In addition, when the internal temperature of reactor 1 was 120° C., the maximum efficiency for treating the catalyst protection liquid was given when the oxygen-containing gas was supplied with satisfying $O_2$/COD (Cr)=0.99. The treatment efficiency of COD (Cr) in this case was 100%.

The catalyst protection liquid supply was started as mentioned above. After confirming the catalyst protection liquid being exhausted by the reactor through pressure control valve 12, the rising of the treatment temperature was started by heater 3 and electric heater 2. During the temperature rising, the catalyst protection liquid was constantly fed into the catalyst bed to suppress deterioration of the catalyst activity. The pressure in reactor 1 was controlled to keep the pressure at 0.6 MPa (Gauge). According to the pressure control, the pressure in reactor 1 increased gradually, through it was the atmosphere pressure on starting the air supply. It was then stabilized at 0.6 MPa (Gauge) after the temperature in reactor 1 reached higher than 100° C. On starting-up, the oxidizable substances (methanol) contained in the protection liquid was constantly made to stay in the liquid passed through the catalyst bed. This process of starting up the equipment according to the catalyst protection liquid supply continued until the internal temperature of reactor 1 reached 120° C. When the internal temperature reached 120° C., the concentration of the catalyst protection liquid in gas-liquid separator 11 was COD (Cr)=10400 mg/liter. In addition, the oxygen concentration in the exhaust gas during the temperature rising was constantly 0 vol % after the internal temperature of reactor 1 reached higher than 60° C.

After the internal temperature of reactor 1 reached 120° C., the supply of the catalyst protection liquid was stopped, immediately followed by changing over to the supply of the waste water to be treated. The waste water to be treated was supplied through waste water feed line 6, as was the case with the catalyst protection liquid. In addition, as the waste water to be treated, used was water exhausted by manufacturing facilities of aliphatic carboxylic acids and aliphatic carboxylate. The waste water contained an organic compound having 2 or more carbon atoms per molecule such as alcohol, aldehyde and carboxylic acid. The COD (Cr) concentration of the waste water was 15000 mg/liter and pH thereof equaled 2.8. In addition, 40% of the total TOC component was acetic acid.

In the treatment process of the waste water, heater 3 and electric heater 2 were controlled to keep the internal temperature of reactor 1 at 130° C. The air supply amount was controlled by oxygen-containing gas flow control valve 9 to keep the oxygen concentration of the exhaust gas in gas-liquid separator 11 at 0.2 vol %. The controlled air supply amount was 0.96 in term of $O_2$/COD (Cr) ratio. Moreover, the liquid level of the treated water in gas-liquid separator 11 was detected by a liquid-level controller LC and kept a constant liquid level by the control of treated water exhaust pump 14. Except for these, the treatment was performed in the same manner as in the process of starting up the equipment. Furthermore, the treated water that had flowed out from treated water exhaust pump 14 was then exhausted trough treated water exhaust line 15, to be sampled at pleasure for measurement of COD (Cr) concentration thereof. When the treatment was stabilized after the 50-hour operation of the equipment, the COD (Cr) treatment efficiency was 96%.

As a result, after the 50-hour supply of the waste water, the COD (Cr) treatment efficiency was 65%. In addition, the air supply amount on this point was 0.65 in term of the ratio of $O_2$/COD (Cr).

Examples 19 to 23

Treatments were performed in the same manner including the same processes and same conditions as in example 18 except for using liquids shown in table 5 as the catalyst protection liquid instead of the liquid containing about 10 g/liter of methanol. The waste water to be treated was also the same as that used in example 18. Each catalyst protection liquid had a COD (Cr) concentration of 15000 mg/liter. The results were shown in Table 5. Additionally, the waste water to be treated was also used as the catalyst protection liquid in example 23. In other words, the liquid to be used as the catalyst protection liquid was the same as the waste water to be treated after the temperature rising. In case of the internal temperature of reactor 1 being 120° C., the maximum efficiencies for treating the catalyst protection liquids in examples 19 to 22 were given when air was supplied with satisfying $O_2$/COD=about 1.0. The treatment efficiencies of COD (Cr) in this case were 100%. On the other hand, in case of the internal temperature of reactor 1 being 120° C., the maximum efficiency for treating the catalyst protection liquid in example 23 was given when supplying air with satisfying $O_2$/COD=0.82. The treatment efficiency of COD (Cr) in this case was 82%. Accordingly, air was supplied with satisfying $O_2$/COD=about 0.25 in example 23 in order to obtain a D1 value of 0.3.

TABLE 5

|  | The Catalyst Protection Liquid | D1 Value | Oxygen Concentration In Exhaust Gas (vol %) | Remained COD(Cr) Concentration In The Protection Liquid (mg/L) | COD(Cr) Treatment Efficiency Of The Waste Water (%) |
| --- | --- | --- | --- | --- | --- |
| Example 19 | Ethanol | 0.3 | 0 | 10,400 | 95 |
| Example 20 | Propanol | 0.3 | 0 | 10,400 | 93 |
| Example 21 | Formic Acid | 0.3 | 0 | 10,400 | 93 |
| Example 22 | Formaldehyde | 0.3 | 0 | 10,400 | 92 |
| Example 23 | Waste Water To Be Treated | 0.3 | 0 | 11,300 | 95 |

Comparative Example 10

A treatment was performed with using the equipment illustrated in FIG. 1 in the same manner as in example 18 except for using water in the starting up process instead of the catalyst protection liquid having 15000 mg/liter of COD (Cr) containing about 10 g/liter of methanol. The supply amount of oxygen-containing gas (air) equaled to the air supply amount in example 18. Accordingly, the oxygen concentration of the exhaust gas in gas-liquid separator 11 was constantly 21 vol %.

Subsequently, after the temperature rising to 120° C., the liquid to be supplied was changed over from water to the waste water as in the case with example 18, to start the treatment of the waste water. In addition, the waste water to be treated was same as the one used in example 18. Also, as in the case with example 18, the internal temperature of reactor 1 was set to 130° C. and oxygen-containing gas flow control valve 9 was controlled so as to keep the oxygen concentration of the exhaust gas in gas-liquid separator 11 at 0.2 vol %.

Examples 24 to 27 and Comparative Examples 11 and 12

The treatment was performed in the same manner including the same catalyst protection liquid, waste water, catalyst, treatment conditions and equipment as in example 18, except for setting the aforementioned D1 values to values shown in table 6. The results were shown in table 6.

TABLE 6

|  | D1 Value | Oxygen Concentration In Exhaust Gas (vol %) | Remained COD(Cr) Concentration In The Protection Liquid (mg/L) | COD(Cr) Treatment Efficiency Of The Waste Water (%) |
| --- | --- | --- | --- | --- |
| Example 24 | 0.1 | 0 | 12,900 | 96 |
| Example 25 | 0.7 | 0 | 4,400 | 94 |
| Example 26 | 0.9 | 0 | 1,200 | 93 |
| Example 27 | 1.2 | 3.5 | 0 | 84 |

TABLE 6-continued

| | D1 Value | Oxygen Concentration In Exhaust Gas (vol %) | Remained COD(Cr) Concentration In The Protection Liquid (mg/L) | COD(Cr) Treatment Efficiency Of The Waste Water (%) |
|---|---|---|---|---|
| Comparative Example 11 | 1.5 | 7.0 | 0 | 69 |
| Comparative Example 12 | 2.0 | 10.5 | 0 | 68 |

Example 28

The waste water treatment was performed with using the equipment illustrated in FIG. 1 in the same manner as in example 18 except for the following conditions. Into the reactor, loaded were 1 liter (440 g) of pellet type solid catalysts having a diameter of 5 mmϕ to give a catalyst bed height of 1880 mmH. The solid catalyst had activated carbon and palladium as main components and contained 0.5 weight % of palladium. As the catalyst protection liquid, used was the liquid having 10000 mg/liter of COD (Cr) containing about 6 g/liter of methanol. The liquid was fed with pressure rising by waste water feed pump 5 at the flow rate of 2 liter/h. In addition, pressure control valve 12 was controlled to keep the pressure in reactor 1 at 0.5 MPa (Gauge).

The air supply amount was controlled so that the aforementioned D1 value was 0.4 when the internal temperature of reactor 1 was 110° C. This process continued until the internal temperature of reactor 1 reached 110° C. according to the catalyst protection liquid supply. When the internal temperature reached 110° C. the density of the catalyst protection liquid at the catalyst bed exit (in gas-liquid separator) was COD (Cr)=5800 mg/liter. In addition, the oxygen concentration of the exhaust gas during the temperature rising was constantly 0 vol % after the internal temperature of reactor 1 reached higher than 60° C.

In case of the internal temperature of reactor 1 being 110° C. the maximum efficiency for treating the catalyst protection liquid in example 6 was given when air was supplied with satisfying $O_2/COD=0.99$. The treatment efficiency of COD (Cr) in this case was 100%.

As soon as the maximum efficiency was given, the supply of the catalyst protection liquid was stopped, immediately followed by changing over to supply the waste water to be treated. The waste water to be treated in the present example was solvent-type waste water containing a large amount of alcohols such as ethyl alcohol and propyl alcohol. The COD (Cr) concentration of the waste water was 30000 mg/liter and pH thereof equaled 7.1. This waste water did not include any of alkali metal ion, ammonium ion and inorganic salt.

Additionally, in this waste water treatment, heater 3 and electric heater 2 were controlled to keep the internal temperature of reactor 1 at 115° C. The air supply amount was controlled by oxygen-containing gas flow control valve 9 so that the oxygen concentration of the exhaust gas in gas-liquid separator 11 was kept at 0.5 vol %. The controlled air supply amount was 0.97 in term of the ratio of $O_2/COD$ (Cr).

Consequently, when the treatment was stabilized after the 50-hour supply of the waste water, the COD (Cr) treatment efficiency was 95%.

Comparative Example 13

A process of starting up the equipment was performed in the same manner as in example 28, except for using water instead of supplying the catalyst protection liquid during the temperature rising of the equipment. The air supply amount was set to the same air amount supplied in example 28. Accordingly, during the temperature rising, the oxygen concentration of the exhaust gas in gas-liquid separator 11 was constantly 21 vol %.

Subsequently, after the temperature rising to 110° C., the liquid to be supplied was changed over from water to the same waste water as the one used in example 28, i.e., solvent-type waste water containing a large amount of alcohols such as ethyl alcohol and propyl alcohol, to start the treatment thereof. Also, as in the case with example 28, oxygen-containing gas flow control valve 9 was controlled so that the oxygen concentration of the exhaust gas in gas-liquid separator 11 was kept at 0.5 vol %.

As a result, after 50-hour supply of the waste water, the COD (Cr) treatment efficiency was 55%. In addition, the air supply amount was 0.56 in term of the ratio of $O_2/COD$ (Cr).

Example 29

The equipment illustrated in FIG. 2 was used in the present example. The same amount of the same solid catalyst as the one used in example 18 was loaded into the reactor. Then the waste water treatment was performed in the same manner (same waste water, treatment processes and treatment conditions) as in example 18.

The temperature rising was conducted with using the catalyst protection liquid. When the internal temperature of reactor 21 reached 120° C., the density of the catalyst protection liquid at the catalyst bed exit (in gas-liquid separator 11) was COD (Cr)=10400 mg/liter. In addition, the oxygen concentration in the exhaust gas on the temperature rising was constantly 0 vol % after the internal temperature of reactor 21 reached higher than 60° C.

As a result, when the treatment was stabilized after 50-hour supply of the waste water, the COD (Cr) treatment efficiency was 88%. The air supply amount on treating the waste water was controlled by oxygen-containing gas flow control valve 9 in such a manner that the oxygen concentration of the exhaust gas in gas-liquid separator 11 was kept at 0.2 vol %. The air supply amount on this point was 0.89 in term of the ratio of $O_2/COD$ (Cr).

Example 30

Figure 4:
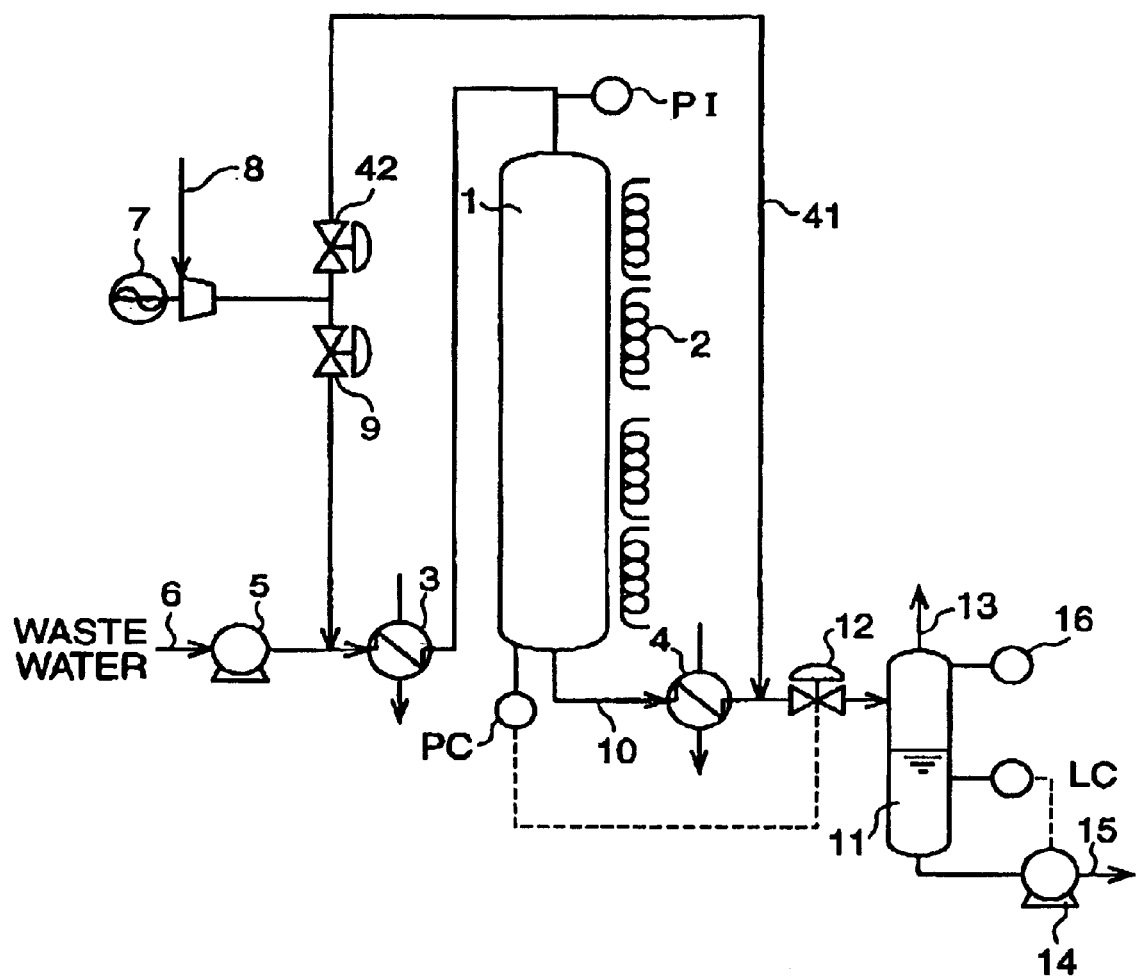
FIG. 4 is a schematic diagram of the separation unit for use in the method of this invention.

A waste water treatment was performed with using the equipment illustrated in FIG. 4. The equipment illustrated in FIG. 4 has the same structure as that of the equipment illustrated in FIG. 1 except that an additional air supply location, which is for keeping the pressure in the equipment when starting up the equipment, is provided to rearward of reactor 1. In other words, the equipment in FIG. 4 has oxygen-containing gas supply line 41 connected between reactor 1 and pressure control valve 12 in addition to the equipment structure illustrated in FIG. 1. This oxygen-containing gas supply line 41 makes it possible to supply air from the aforementioned oxygen-containing gas supply line 8 to the upstream side of pressure control valve 12 through oxygen-containing gas flow control valve 42.

The treatment was then performed in the same manner as in example 18 except for supplying air through oxygen-containing gas supply line 41 when starting up. That is, the treatment was performed in the same manner as in example 18 except for the followings. The supply air amount when starting up was controlled by oxygen-containing gas flow control valve 42 to adjust the aforementioned D1 to 1.5. In addition, the location for supplying the air was changed from that in example 18. Accordingly, the oxygen concentration of the exhaust gas in gas-liquid separator 11 was constantly 21 vol %. In the process of starting up. However, after the pressure rising, the oxygen concentration of the gas phase in reactor 1 is considered to be 0 vol % (i.e., the aforementioned D1 value equals to 0), since no air is supplied into reactor 1 (solid catalyst bed). In addition, the density of the catalyst protection liquid at the catalyst bed exit (in gas-liquid separator 11) was 14800 mg/liter.

The waste water treatment was performed immediately after the above-mentioned starting up in the same manner as in example 18. The waste water treatment resulted in 96% of the COD (Cr) treatment efficiency.

Example 31

After the waste water treatment was performed as described in example 18, a process of cooling down the equipment was subsequently carried out according to the following method. In this process of cooling down, heating by electric heater 2 and heater 3 were firstly stopped to start cooling the equipment. At the same time, the oxygen-containing gas supply amount was adjusted to 0.82 in term of $O_2$/COD (Cr). Then, immediately after the internal temperature of reactor 1 reached 120° C., the liquid to be supplied was changed over from the waste water to the catalyst protection liquid that was used for starting up in example 18, in order to suppress deterioration of the catalyst activity. In addition, the oxygen-containing gas amount was reduced in such a manner that the D1 value equaled to 0.3. At this time, the oxidizable substances in catalyst protection liquid was made to stay in the liquid passed through the catalyst bed exit.

As a result, the oxygen concentration of the exhaust gas, which was 0.2 vol % during the waste water treatment, gradually decreased and then it was constantly 0 vol % until the temperature of reactor 1 decreased to about 60° C.

After the equipment temperature decreased to 30° C., the temperature was subsequently raised in the same manner as in example 18, followed by another waste water treatment in the same manner as in example 18. In consequence, when this treatment was stabilized after 50-hour supply of the waste water, COD (Cr) treatment efficiency was 96%.

Comparative Example 14

A treatment was performed in the same manner as in example 31 except for using water for cooling down the equipment instead of the catalyst protection liquid having 15000 g/liter of COD (Cr) containing about 10 g/liter of methanol. In the cooling, the oxygen concentration of the exhaust gas in gas-liquid separator 11 increased rapidly, through it was about 0.2 vol % immediately after the changing over from the waste water to water. And it was beyond 20 vol %, when the temperature of reactor 1 reached about 110° C.

After the equipment temperature decreased to 30, the temperature was subsequently raised in the same manner as in example 18, followed by starting another waste water treatment in the same manner as in example 18. In consequence, when this treatment was stabilized after 50-hour supply of the waste water, COD (Cr) treatment efficiency was 71%.

Examples 32 to 36

The waste water treatment in example 19 was followed by a cooling process of the equipment in example 32 as described below with using the catalyst protection liquid shown in table 7. In addition, the waste water treatment in example 20 was followed by a cooling process of the equipment in example 33, the waste water treatment in example 21 was followed by a cooling process of the equipment in example 34, the waste water treatment in example 22 was followed by a cooling process of the equipment in example 35 and the waste water treatment in example 23 was followed by a cooling process of the equipment in example 36. All these cooling processes were performed in the same manner as in example 31. Also, the respective catalyst protection liquid used in the above cooling processes was the same liquid as used in the corresponding example 19 to 23.

In the respective examples, after the equipment temperature decreased to 30° C., the temperature was raised again in the same manner as in the corresponding examples 19 to 23. It was followed by another waste water treatment in the same manner as in example 18. Shown in table 7 were the results of COD (Cr) treatment efficiencies obtained when the treatments in the examples were stabilized after 50-hour supply of the waste water.

TABLE 7

| | The Catalyst Protection Liquid | D1 Value | COD(Cr) Treatment Efficiency Of The Waste Water (%) |
|---|---|---|---|
| Example 32 | Ethanol | 0.3 | 95 |
| Example 33 | Propanol | 0.3 | 93 |
| Example 34 | Formic Acid | 0.3 | 93 |
| Example 35 | Formaldehyde | 0.3 | 92 |
| Example 36 | Waste Water To Be Treated | 0.3 | 95 |

Example 37

A treatment was performed with using the same catalyst protection liquid, waste water, treatment conditions and equipment as those in example 31 except for adjusting the oxygen-containing gas supply amount on cooling to 1.1 in term of the D1 value.

As a result, the oxygen concentration gradually increased and it reached about 2 vol % at 110° C. In addition, the remaining COD (Cr) concentrations of the catalyst protection liquid in gas-liquid separator 11 at 110° C.; and 80° C. were both less than 100 mg/liter. The waste water treatment was then performed in the same manner as in example 18, resulting in 88% of the COD (Cr) treatment efficiency.

Examples 38 to 42

First of all, a standard waste water treatment was performed with using the equipment illustrated in FIG. 1. Into the reactor, loaded were 1 liter (390 g) of pellet type solid catalysts having a diameter of 4 mmφ to give a catalyst bed height of 1880 mmH. The solid catalyst had activated carbon and platinum as main components and included 0.3 weight % of platinum. In addition, as the waste water for the standard treatment, used was water exhausted by manufacturing facilities of aliphatic carboxylic acids and aliphatic carboxylate. The waste water contained an organic compound having 2 or more carbon atoms per molecule such as alcohol, aldehyde and carboxylic acid. The COD (Cr) concentration of the waste water was 15000 mg/l and pH thereof equaled 2.8. In addition, 53% of the total TOC component was acetic acid.

The waste water was pressurized at the flow rate of 1 liter/h. Subsequently, the waste water was heated up to 120° C. by heater 3 and the internal temperature was kept at 120° C. by electric heater 2. The oxygen-containing gas (air) was then supplied to the waste water prior to the waste water was heated by to heater 3. The pressure in reactor 1 was controlled to keep the pressure at 0.6 MPa (Gauge).

During the first 50-hour operation of the equipment, the air supply amount was controlled so that the oxygen concentration of the exhaust gas was 0.5%. As a result, the COD (Cr) treatment efficiency was 94% after the 50-hour operation.

Then, when the operation time was between 50 to 100 hours, the air supply amount was controlled so that the oxygen concentration of the exhaust gas was 10% in order to deteriorate the catalyst activity. Furthermore, when the operation time was between 100 to 150 hours, the air supply amount was controlled so that the oxygen concentration of the exhaust gas was again 0.5%. This 150-hour operation decreased the COD (Cr) treatment efficiency to 66%.

(Recovering Treatment Process)

The following recovering treatments were respectively performed to the catalyst whose COD (Cr) treatment efficiency had decreased from 94% to 66% in the above-mentioned treatments.

In the recovering treatment process, a catalyst-recovering liquid was fed with pressure rising by waste water feed pump 5 at the flow rate of 1 liter/h. Subsequently, the recovering liquid was heated up to 140° C. by heater 3 and then supplied to reactor 1 from its upside to make a gas-liquid downward concurrent flow. The catalyst recovering liquid used in this recovering process was a liquid containing about 10 g/liter of methanol and having 15 g/liter of COD (Cr). The oxygen-containing gas (air) was then supplied to the recovering liquid according to the respective ratios shown in table 8 prior to the recovering liquid was heated by heater 3.

After the recovering liquid passed through the catalyst bed, it was cooled by cooler 4. Subsequently, it was exhausted through pressure control valve 12 with its pressure being recovered, followed by separating gas from liquid in the exhausted water by gas-liquid separator 11. In this process, at pressure control valve 12, the pressure in reactor 1 was controlled to keep the pressure at 0.6 MPa (Gauge).

This recovering treatment was continued for 5 hours in respective tests in the present examples. Then another 50-hour waste water treatment was conducted under the same conditions as in the respective former waste water treatments. The remaining amounts of the recovering liquid in the recovering process and the waste water treatment efficiencies in the waste water treatment process were shown in table 8.

In example 42, nitrogen gas was supplied in the recovering treatment process instead of the oxygen-containing gas. The supply amount of the nitrogen gas was set to be equal to that of the oxygen-containing gas in example 39.

TABLE 8

|  | $O_2$/COD | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
| --- | --- | --- | --- | --- | --- |
| Example 38 | 0.2 | 0.2 | 0 | 11,800 | 94 |
| Example 39 | 0.5 | 0.5 | 0 | 7,400 | 94 |
| Example 40 | 0.8 | 0.8 | 0 | 3,000 | 91 |
| Example 41 | 1.0 | 1.0 | 0.1 | <100 | 83 |
| Example 42 | 0 | 0 | 0 | 14,500 | 94 |

Examples 43 to 46, Comparative Example 15

The recovering treatment was performed in the same manner including the same catalyst, treatment processes, treatment conditions and equipment as in example 39, except for setting recovering treatment temperature as shown in table 9. The results were also shown in table 9.

The temperature in example 46 was set to 160° C. and the pressure was set to 0.9 MPa (Gauge). The temperature in comparative example was set to 220° C. and the pressure was set to 2.5 MPa (Gauge).

TABLE 9

|  | Recovering Treatment Temperature (° C.) | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
| --- | --- | --- | --- | --- | --- |
| Example 43 | 80 | 0.5 | 0 | 7,500 | 78 |
| Example 44 | 100 | 0.5 | 0 | 7,500 | 82 |
| Example 45 | 125 | 0.5 | 0 | 7,400 | 93 |
| Example 46 | 160 | 0.5 | 0 | 7,300 | 92 |
| Comparative Example 15 | 220 | 0.5 | 0 | 3,200 | 60 |

Example 47 to 52

The recovering treatment was performed in the same manner including the same catalyst, treatment processes, treatment conditions and equipment as in example 39, except for changing treatment time as shown in table 10. The results were also shown in table 10.

The temperature in example 51 and example 52 was set to 125° C. and the treatment was performed in the same manner as in example 45.

TABLE 10

|  | Recovering Treatment Time (Hr) | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
|---|---|---|---|---|---|
| Example 47 | 2 | 0.5 | 0 | 7,400 | 90 |
| Example 48 | 24 | 0.5 | 0 | 7,400 | 94 |
| Example 49 | 80 | 0.5 | 0 | 7,400 | 93 |
| Example 50 | 500 | 0.5 | 0 | 7,400 | 91 |
| Example 51 | 24 | 0.5 | 0 | 7,400 | 94 |
| Example 52 | 500 | 0.5 | 0 | 7,400 | 93 |

Example 53 to 59

The recovering treatment was performed in the same manner as in example 39, except for changing COD (Cr) concentration of the recovering liquid containing methanol as shown in table 11. The results were also shown in table 11. The recovering treatment in example 57 and example 58 was conducted for 24 hours and the treatment was performed in the same manner as in example 48 and the supply amount of oxygen-containing gas in example 53 to 58 was adjusted to $O_2$/COD=0.50. The recovering treatment in example 59 was conducted for 5 hours and the supply amount of oxygen-containing gas was adjusted to $O_2$/COD= 0.20.

Example 60 to 64

The recovering treatment was performed in the same manner including the same catalyst, treatment processes, treatment conditions and equipment as in example 39, except for using the recovering liquid containing ethanol, propanol, acetone and tetrahydrofuran each of which has COD (Cr)=15 g/L. The results were shown in table 12.

In example 64, the waste water exhausted by manufacturing facilities of aliphatic carboxylic acids and aliphatic carboxylate was used. The waste water contained alcohols having 1 to 4 carbon atoms per molecule. The COD (Cr) concentration of the waste water was 23 g/L and the air supply amount in example 60 to 64 was $O_2$/COD (Cr)=0.5.

TABLE 11

|  | COD(Cr) Concentration Of The Recovering Liquid (mg/L) | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
|---|---|---|---|---|---|
| Example 53 | 1,000 | 0.5 | 0 | 500 | 78 |
| Example 54 | 5,000 | 0.5 | 0 | 2,400 | 92 |
| Example 55 | 30,000 | 0.5 | 0 | 14,000 | 94 |
| Example 56 | 60,000 | 0.5 | 0 | 28,000 | 94 |
| Example 57 | 1,000 | 0.5 | 0 | 500 | 86 |
| Example 58 | 5,000 | 0.5 | 0 | 2,400 | 94 |
| Example 59 | 5,000 | 0.2 | 0 | 3,900 | 94 |

TABLE 12

|  | Recovering Liquid | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
|---|---|---|---|---|---|
| Example 60 | Ethanol | 0.5 | 0 | 7,400 | 93 |
| Example 61 | Propanol | 0.5 | 0 | 7,400 | 89 |
| Example 62 | Formic Acid | 0.5 | 0 | 7,500 | 85 |
| Example 63 | Formaldehyde | 0.5 | 0 | 7,500 | 83 |
| Example 64 | Waste Water To Be Treated | 0.5 | 0 | 10,500 | 92 |

Comparative Example 16, 17

The recovering treatment was performed in the same manner including the same catalyst, treatment processes, treatment conditions and equipment as in example 39, except for setting the air supply amount as shown in table 13. The results were also shown in table 13.

TABLE 13

|  | $O_2$/COD | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
|---|---|---|---|---|---|
| Comparative Example 16 | 1.5 | 1.5 | 7.8 | <100 | 64 |
| Comparative Example 17 | 2.0 | 2.0 | 11.0 | <100 | 63 |

Example 65

The waste water treatment was performed using the equipment illustrated in FIG. 2. The treatment was performed in the same manner including the same waste water and treatment conditions as in example 39. The COD (Cr) treatment efficiencies after 50-hour treatments were 87%. Following the waste water treatment, the recovering treatment was performed in the same treatment conditions as in example 39. The result was shown in table 14. The air supply amount was $O_2$/COD (Cr)=0.5.

Example 66

The recovering treatment was performed in the same manner including the same catalyst, treatment processes, treatment conditions and equipment as in example 39, except for changing the temperature in accordance with the treatment time as follow.

The temperature was set to 160° C. for 1 hour from the start (0 to 1 hour) and then the temperature was set to 125° C. for next 2 hours (1 to 3 hour). The result was shown in table

TABLE 14

|  | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
|---|---|---|---|---|
| Example 65 | 0.5 | 0 | 7,400 | 87 |

TABLE 15

|  | $O_2$/COD | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
|---|---|---|---|---|---|
| Example 66 | 0.5 | 0.5 | 0 | 7,400 | 94 |

Example 67 and 68

The waste water treatment was performed using the equipment illustrated in FIG. 1. Into the reactor, loaded were 1 liter (420 g) of pellet type solid catalysts having a diameter of 3 mmφ to give a catalyst bed height of 1880 mmH. The solid catalyst had activated carbon and palladium as main components and included 0.6 mass % of palladium with respect to the total amount of the solid catalyst. In addition, as the waste water to be treated in the present examples, used was water exhausted by electric power plants. The waste water contained ammonium sulfate, sodium ion and carbonic acid ion. The ammonia concentration of the waste water was 4200 mg/liter and pH thereof equaled 7.8.

The aforementioned waste water was fed with pressure rising at the flow rate of 1 liter/h. Subsequently, the waste water was heated up to 130° C. by heater 3. The oxygen-containing gas (air) was then supplied to the waste water prior to the waste water was heated by to heater 3.

In reactor 1, the waste water temperature was maintained to be 130° C. by electric heater 2. The pressure in reactor 1 was controlled to keep the pressure at 0.9 MPa (Gauge).

During the first 50-hour operation of the equipment, the air supply amount was controlled so that the oxygen concentration of the exhaust gas was 0.5%. As a result, the ammonia treatment efficiency was 95% after the 50-hour operation.

Then, when the operation time was between 50 to 100 hours, the air supply amount was controlled so that the oxygen concentration of the exhaust gas was 10% in order to deteriorate the catalyst activity. Furthermore, when the operation time was between 100 to 150 hours, the air supply amount was controlled so that the oxygen concentration of the exhaust gas was again 0.5%. This 150-hour operation decreased the ammonia treatment efficiency to 54%.

(Recovering Treatment Process)

The following regeneration treatments were respectively performed to the catalyst whose ammonia treatment efficiency had decreased from 95% to 54% in the above-mentioned treatments.

In the recovering treatment process, a catalyst recovering liquid was supplied with pressure rising by waste water feed pump 5 at the flow rate of 1 liter/h. Subsequently, the recovering liquid was heated up to 150° C. by heater 3 and then supplied to reactor 1 from its head to make a gas-liquid downward concurrent flow. The catalyst recovering liquid used in this recovering process was a liquid containing about 8 g/liter of methanol and having 12 g/liter of COD (Cr). The oxygen-containing gas (air) was then supplied to the recovering liquid according to the respective ratios shown in table 16 prior to the recovering liquid was heated by heater 3.

After the recovering liquid passed through the catalyst bed, it was cooled by cooler 4. Subsequently, it was exhausted through pressure control valve 12 with its pressure being recovered, followed by separating gas from liquid in the exhausted water by gas-liquid separator 11. In this process, at pressure control valve 12, the pressure in reactor 1 was controlled to keep the pressure at 0.9 MPa (Gauge).

This recovering treatment was continued for 7 hours in respective tests in the present examples. Then another 50-hour waste water treatment was conducted under the same conditions as in the respective former waste water treatments. The result was shown in table 16.

TABLE 16

|  | $O_2$/COD | D2 Value | Oxygen Concentration In The Exhaust Gas During The Recovering Treatment (%) | Remaining COD(Cr) Concentration In The Recovering Treatment (mg/L) | Treatment Efficiency Of The Waste Water After Recovering Treatment (%) |
|---|---|---|---|---|---|
| Example 67 | 0.5 | 0.5 | 0 | 5,500 | 95 |
| Example 68 | 0.8 | 0.8 | 0 | 1,700 | 92 |

Catalyst Preparation 1

Pellet type activated carbons (an average particle diameter of 4 mm and an average length of 5.5 mm) having specific surface area of 1200 m²/g by BET method and specific pore volume having pore diameter in the range from 0.1 to 10 μm of 0.63 ml/g by mercury penetration method was used for a catalyst preparation. Titanyl sulfate aqueous solution was deposited on the pellets by impregnation method and the pellets was dried in the nitrogen atmosphere at 90° C. Thus obtained was calcined in the nitrogen atmosphere at 400° C. for 3 hours to obtain titania-deposited-activated-carbon pellets. Platinum nitrate aqueous solution was deposited on the pellets by impregnation method and the pellets were dried in nitrogen gas at 90° C. After that thus obtained pellets were calcined in hydrogen containing gas at 300° C. for 3 hours to obtain catalysts (A-1). Main component and mass ratio of the catalyst (A-1) were shown in Table 17. The contents and the composition of titan and platinum were expressed by converted into metal thereof. The average mechanical strength of the catalyst was declined to 6.4 kg per particle, the specific surface area was declined to 900 m²/g by BET method and the specific pore volume having pore diameter in the range from 0.1 to 10 μm of 0.48 ml/g by mercury penetration method.

Catalyst Preparation 2 to 8

The catalyst was prepared in the same manner including the same processes, pellet type activated carbon and conditions as in catalyst preparation 1 except that following solution was used instead of titanyl sulfate aqueous solution;

Catalyst preparation 2: zirconyl nitrate aqueous solution
Catalyst preparation 3: iron nitrate aqueous solution
Catalyst preparation 4: manganese nitrate aqueous solution
Catalyst preparation 5: cerium nitrate aqueous solution
Catalyst preparation 6: praseodymium nitrate aqueous solution
Catalyst preparation 7: tin sulfate aqueous solution
Catalyst preparation 8: bismuth nitrate aqueous solution.

Thus obtained catalysts (A-2 to A-8 respectively) was shown in Table 17. Main component and mass ratio of the catalyst (A-2 to A-8) were shown in Table 17. The average mechanical strength of each catalysts was almost same with that of catalyst A-1. The same decline value in the specific surface area and specific pore volume having pore diameter in the range from 0.1 to 10 μm of the catalyst A-1 was shown in that of A-2 to A-8.

Catalyst Preparation 9 to 10

The catalyst was prepared in the same manner including the same processes, pellet type activated carbon and conditions as in catalyst preparation 1 except that following solution was used instead of nitric acid platinum aqueous solution;

Catalyst preparation 9: palladium nitrate aqueous solution
Catalyst preparation 10: ruthenium nitrate aqueous solution.

Thus obtained catalysts (B-1 and B-2 respectively) was shown in Table 17. Main component and mass ratio of the catalyst (B-1 and B-2) were shown in Table 17. The average mechanical strength of each catalysts was almost same with that of catalyst A-1. The same decline value in the specific surface area and specific pore volume having pore diameter in the range from 0.1 to 10 μm of catalyst A-1 was shown in that of B-1 and B-2.

Catalyst Preparation 11 to 12

The catalyst was prepared in the same manner including the same processes, pellet type activated carbon and conditions as in catalyst preparation 1 except that the ratio of titanyl sulfate supported on the pellets was changed as shown in Table 17.

Thus obtained catalysts (C-1 and C-2 respectively) was shown in Table 17. Main component and mass ratio of the catalyst (C-1 and C-2) were shown in Table 17. The average mechanical strength of each catalysts was almost same with that of catalyst A-1. The specific surface area of the catalyst C-1 was declined to 1100 m$^2$/g by BET method and the specific pore volume having pore diameter in the range from 0.1 to 10 μm of 0.55 ml/g by mercury penetration method. The specific surface area of the catalyst C-2 was declined to 700 m$^2$/g by BET method and the specific pore volume having pore diameter in the range from 0.1 to 10 μm of 0.43 ml/g by mercury penetration method.

Catalyst Preparation 13 to 14

The catalyst was prepared in the same manner including the same processes, pellet type activated carbon and conditions as in catalyst preparation 1 except that zirconyl nitrate aqueous solution as used in catalyst preparation 2 was used instead of titanyl sulfate aqueous solution and the ratio of the zirconyl nitrate supported on the pellets was changed as shown in Table 17. Thus obtained catalysts (C-3 and C-4 respectively) was shown in Table 17. Main component and mass ratio of the catalyst (C-3 and C-4) were shown in Table 17. The average mechanical strength of each catalysts was almost same with that of catalyst A-1. The specific surface area of the catalyst C-3 was declined to 1100 m$^2$/g by BET method and the specific pore volume having pore diameter in the range from 0.1 to 10 μm of 0.54 ml/g by mercury penetration method. The specific surface area of the catalyst C-4 was declined to 800 m$^2$/g by BET method and the specific pore volume having pore diameter in the range from 0.1 to 10 μm of 0.45 ml/g by mercury penetration method.

Catalyst Preparation 15

Titanyl sulfate and of platinum nitrate aqueous solution used in the catalyst preparation 1 were thoroughly mixed. The produced mixture was supported on the pellet type activated carbon used in the preparation 1 by impregnation method and thus obtained pellets was dried in the nitrogen atmosphere at 90° C. and then was calcined in hydrogen containing gas at 300° C. for 3 hours to obtain catalyst (D-1).

Main component and mass ratio of the catalyst (D-1) were shown in Table 17. The average mechanical strength of each catalysts was almost same with that of catalyst A-1. The same decline value in the specific surface area and specific pore volume having pore diameter in the range from 0.1 to 10 μm of catalyst A-1 was shown in that of D-1

Example 69

500 hours of waste water treatment was performed under the following conditions with using the equipment illustrated in FIG. 1. A reactor 1 having cylindrical shape (a diameter of 26 mmϕ and a length of 3000 mm) was used in the treatment. Into the reactor, loaded were 1 liter (410 g) of catalyst A-1. In addition, as the waste water to be treated in the present examples, used was waste water exhausted by chemical plants. The waste water contained organic compounds such as acetic acid and propionic acid. The COD (Cr) concentration of the waste water was 25 g/liter.

The aforementioned waste water was fed with pressure rising by waste water feed pump 5 at the flow rate of 1 liter/h. Subsequently, the waste water was heated up to 130° C. by heater 3 and then supplied to reactor 1 from its head to make a gas-liquid downward concurrent flow for the treatment. Air was also introduced through oxygen-containing gas supply line 8, followed by being compressed by compressor 7. The oxygen-containing gas (air) was then supplied to the waste water prior to the waste water was heated by to heater 3. The supply amount of the oxygen-containing gas was adjusted by oxygen-containing gas flow valve 9 so that the oxygen concentration in the exhaust gas was in the range from 0.1 to 0.5%.

In reactor 1, the waste water temperature was maintained to be 130° C. by electric heater 2 to perform oxidation/decomposition treatments. The obtained treated water was cooled by cooler 4. Subsequently, it was exhausted through pressure control valve 12 with its pressure being recovered, followed by separating gas from liquid in the exhausted water by gas-liquid separator 11. In this process, at pressure control valve 12, pressure controller PC detected and controlled the pressure in reactor 1 to keep the pressure at 0.4 MPa (Gauge). In addition, oxygen concentration of the exhaust gas in gas-liquid separator 11 was measured by using oxygen content meter 16. The COD (Cr) concentration of the treated water in gas-liquid separator 11 was also measured. On temperature rising in reactor 1, the waste water was supplied to reactor 1 under the condition of oxygen deficiency in order to suppress deterioration of the catalyst therein.

The results was shown in table 17. As a result, it was found that the properties (specific surface area, specific pore volume having pore diameter in the range from 0.1 to 10 μm, pore diameter distribution and mechanical strength) of catalyst A-1 stayed unchanged after the treatments.

Example 70 to 82

In examples 70 to 82, the treatment was performed in the same manner including the same waste water, treatment processes, treatment conditions and equipment as in example 69, except that the catalysts A-2 to A-8, B-1, B-2, and C-1 to C-4 was used in each examples respectively instead of catalyst A-1. The results were shown in table 17. As a result, it was found that the properties (specific surface area, specific pore volume having pore diameter in the range from 0.1 to 10 μm, pore diameter distribution and mechanical strength) of these catalysts stayed unchanged after the treatments.

Example 83

In example 83, the treatment was performed in the same manner including the same waste water, treatment processes, treatment conditions and equipment as in example 69, except that the catalyst D-1 was used in each examples respectively instead of catalyst A-1. The results were shown in table 17. As a result, it was found that the properties (specific surface area, specific pore volume having pore diameter in the range from 0.1 to 10 μm, pore diameter distribution and mechanical strength) of these catalysts stayed unchanged after the treatments.

Example 84

The treatment was performed in the same manner including the same catalyst, treatment processes and equipment as in example 69 except for the following 4 points: 1) waste water to be treated was waste water containing formic acid as a main ingredient and COD (Cr) concentration was 8000 mg/L; 2) the treatment temperature was set to 95° C.; 3) the treatment pressure was set to the atmosphere pressure: and 4) the supply amount of waste water was adjusted to 0.75 L/h.

After 500 hour treatment, COD (Cr) treatment efficiency of the waste water was 98% and the properties (specific surface area, specific pore volume having pore diameter in the range from 0.1 to 10 μm, pore diameter distribution and mechanical strength) of these catalysts stayed unchanged after the treatments.

Example 85

The treatment was performed for 500 hours in the same manner including the same catalyst, waste water, treatment processes and equipment as in example 69 except for the following 3 points: 1) the treatment temperature was set to 190° C.; 2) the treatment pressure was set to 2.5 MPa (Gauge); and 3) the supply amount of the waste water 2.0 L/h. After 500 hour treatment, COD (Cr) treatment efficiency of the waste water was 100%. Following the first 500-hour treatment, the treatment was continued in the same manner including treatment processes and treatment conditions as in example 69 except that the treatment temperature was set to 130° C. and the treatment pressure was set to 0.4 MPa (Gauge). The supply amount of the oxygen containing gas was controlled so that the oxygen concentration in the exhaust gas maintained in the range from 0.1 to 0.5 vol %. After 100 hour treatment, COD (Cr) treatment efficiency of the waste water was 89% and the properties (specific surface area, specific pore volume having pore diameter in the range from 0.1 to 10 μm, pore diameter distribution and mechanical strength) of these catalysts stayed unchanged after the treatments, it was observed over the catalyst bed that the catalyst kept its shape and the amount thereof had maintained.

Example 86

The treatment was performed for 500 hours at 190° C. in the same manner including the same waste water, treatment processes, treatment conditions and equipment as in example 85 except that catalyst C-2 was used instead of catalyst A-1. After 500-hour treatment, COD (Cr) treatment efficiency of the waste water was 100%. After next 100 hours treatment at 130° C., COD (Cr) treatment efficiency was the same as that of example 80 (i.e. COD (Cr) treatment efficiency of the waste water was 93%) and the properties (specific surface area, specific pore volume having pore diameter in the range from 0.1 to 10 μm, pore diameter distribution and mechanical strength) of these catalysts stayed unchanged after the treatments, it was observed over the catalyst bed that the catalyst kept its shape and the amount thereof had maintained.

Example 87

The treatment was performed in the same manner including the same catalyst, waste water, treatment processes, treatment conditions and equipment as in example 70 except in that the supply amount of the oxygen-containing gas was adjusted so that the oxygen concentration in the exhaust gas was in the range from 10 to 11%.

After 500 hour treatment, COD (Cr) treatment efficiency of the waste water was 87% which was the same value of COD (Cr) treatment efficiency after 100 hour treatment. The wastewater was treated stably throughout the treatment and the properties (specific surface area, specific pore volume having pore diameter in the range from 0.1 to 10 μm, pore diameter distribution and mechanical strength) of these catalysts stayed unchanged after the treatments.

TABLE 17

| | Catalyst No. | Weight Ratio Of Catalyst | COD(Cr) Treatment Efficiency (%) | Remarks |
| --- | --- | --- | --- | --- |
| Catalyst Preparation 1 | A-1 | Activated Carbon/Ti/Pt = 98.7/1.0/0.3 | 92 | Example 69 |
| Catalyst Preparation 2 | A-2 | Activated carbon/Zr/Pt = 98.7/1.0/0.3 | 94 | Example 70 |
| Catalyst Preparation 3 | A-3 | Activated carbon/Fe/Pt = 98.7/1.0/0.3 | 89 | Example 71 |
| Catalyst Preparation 4 | A-4 | Activated carbon/Mn/Pt = 98.7/1.0/0.3 | 71 | Example 72 |

TABLE 17-continued

| Catalyst | No. | Weight Ratio Of Catalyst | COD(Cr) Treatment Efficiency (%) | Remarks |
|---|---|---|---|---|
| Catalyst Preparation 5 | A-5 | Activated carbon/Ce/Pt = 98.7/1.0/0.3 | 88 | Example 73 |
| Catalyst Preparation 6 | A-6 | Activated carbon/Pr/Pt = 98.7/1.0/0.3 | 86 | Example 74 |
| Catalyst Preparation 7 | A-7 | Activated carbon/Sn/Pt = 98.7/1.0/0.3 | 62 | Example 75 |
| Catalyst Preparation 8 | A-8 | Activated carbon/Bi/Pt = 98.7/1.0/0.3 | 66 | Example 76 |
| Catalyst Preparation 9 | B-1 | Activated carbon/Ti/Pd = 98.7/1.0/0.3 | 81 | Example 77 |
| Catalyst Preparation 10 | B-2 | Activated carbon/Ti/Ru = 98.5/1.0/0.5 | 67 | Example 78 |
| Catalyst Preparation 11 | C-1 | Activated carbon/Ti/Pt = 99.2/0.5/0.3 | 76 | Example 79 |
| Catalyst Preparation 12 | C-2 | Activated carbon/Ti/Pt = 96.7/3.0/0.3 | 93 | Example 80 |
| Catalyst Preparation 13 | C-3 | Activated carbon/Zr/Pt = 99.2/0.5/0.3 | 80 | Example 81 |
| Catalyst Preparation 14 | C-4 | Activated carbon/Zr/Pt = 96.7/3.0/0.3 | 96 | Example 82 |
| Catalyst Preparation 15 | D-1 | Activated carbon/Ti/Pt = 98.7/1.0/0.3 | 60 | Example 83 |

EFFECT OF THE INVENTION

In the method of oxidizing/decomposing organic and/or inorganic oxidizable substances in the waste water by catalytic wet oxidation, the present invention provides a method for treating waste water efficiently for a long period in a stable manner by wet oxidation using a catalyst containing activated carbon at low temperature and under low pressure.

The present invention also provides a method for suppressing deterioration of the catalytic activity of the solid catalyst at the time of temperature rising when starting up the operation of the wet oxidation and/or at the time of temperature lowering when suspending the operation of the wet oxidation.

The present invention further provides a method for efficiently recovering the degraded catalytic activity of the catalyst containing activated carbon.

This application is based on Japanese patent application serial No. 2000-5198 filed on Jan. 5, 2000, No. 2000-102629 filed on Apr. 4, 2000, and Nos. 2000-114130 and 2000-114131 filed on Apr. 14, 2000, whose priorities are claimed under Paris convention, thus the contents thereof is incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A method for oxidizing and/or decomposing organic and/or inorganic oxidizable substances in waste water by wet oxidation with a use of a catalyst, which comprises:

oxidizing and/or decomposing the oxidizable substances with an oxygen containing gas in the presence of the catalyst under pressure, 3 which produces an exhaust gas, wherein the waste water remains in a liquid phase at a temperature of 50 to less than 170° C., wherein the catalyst contains activated carbon and at least one element selected from the group consisting of Pt, Pd, Rh, Ru, Ir and Au, and wherein the catalyst contains pores having a pore diameter in a range of 0.1 to 10 µm and a specific pore volume in a range of 0.1 to 0.8 ml/g; and controlling the concentration of oxygen in the exhaust gas in a range of 0 to 5 vol %.

2. The method according to claim 1, wherein the catalyst further contains at least one element selected from the group consisting of Ti, Zr, Hf, Nb, Ta, Fe, Co, Mn, Al, Si, Ga, Ge, Sc, Y, La, Ce, Pr, Mg, Ca, Sr, Ba, In, Sn, Sb and Bi.

3. The method according to claim 1, wherein the specific pore volume is decreased to a range of 0.01 to 0.5 ml/g after at least one element selected from the group consisting of Ti, Zr, Hf, Nb, Ta, Fe, Co, Mn, Al, Si, Ga, Ge, Sc, Y, La, Ce, Pr, Mg, Ca, Sr, Ba, In, Sn, Sb and Bi is deposited on the activated carbon when compared with the specific pore volume before the element is deposited.

4. The method according to claim 1, wherein the catalyst has a specific surface area, wherein the specific surface area is decreased to a range of 50 to 800 m²/g after at least one element selected from the group consisting of Ti, Zr, Hf, Nb, Ta, Fe, Co, Mn, Al, Si, Ga, Ge, Sc, Y, La, Ce, Pr, Mg, Ca, Sr, Ba, In, Sn, Sb and Bi is deposited on the activated carbon when compared with the specific surface area before the element is deposited.

5. The method according to claim 1, wherein the amount of the oxygen containing gas which is added is controlled so that the amount of oxygen in the oxygen containing gas relative to the oxygen demand of the waste water at maximum waste water treatment efficiency is a ratio of 0.8:1 to 1.3:1.

6. The method according to claim 1, wherein the oxygen containing gas and the waste water descend concurrently at the catalyst.

7. The method according to claim 1, wherein the oxygen containing gas is supplied from at least two locations by dividing the total amount of the oxygen containing gas.

8. A method for oxidizing and/or decomposing organic and/or inorganic oxidizable substances in waste water by wet oxidation with a use of a catalyst, which comprises:

oxidizing and/or decomposing the oxidizable substances with an oxygen containing gas in the presence of the catalyst under pressure, wherein the waste water remains in a liquid phase at a temperature of 50 to less than 170° C., wherein the catalyst contains activated carbon and at least one element selected from the group consisting of Pt, Pd, Rh, Ru, Ir and Au, and wherein the catalyst contains pores having a pore diameter in a range of 0.1 to 10 μm and a specific pore volume in a range of 0.1 to 0.8 ml/g; and adding a catalyst protection liquid which contains easily decomposable substances at the time of a temperature increase during the commencement of the wet oxidation and/or at the time of a temperature decrease when wet oxidation is suspended.

9. The method according to claim 8, wherein the amount of the catalyst protection liquid which is added is controlled so that the easily decomposable substances in the protection liquid remain in a liquid phase when passed through the catalyst.

10. The method according to claim 8, wherein the temperature at which the catalyst protection liquid is added is lower than the temperature at which the waste water is treated.

11. The method according to claim 8, wherein the step of oxidizing and/or decomposing the oxidizable substances with the oxygen containing gas produces an exhaust gas; and wherein the concentration of oxygen in the exhaust gas is controlled in a range of 0 to 5 vol % at the time of a temperature increase during the commencement of the wet oxidation and/or at the time of a temperature decrease when wet oxidation is suspended.

12. The method according to claim 8, wherein the amount of the oxygen containing gas which is added is controlled so that the amount of oxygen in the oxygen containing gas relative to the oxygen demand of the protection liquid at maximum catalyst protecting efficiency when the catalyst protection liquid is added is a ratio of 0:1 to 1.3:1.

13. A method for oxidizing and/or decomposing organic and/or inorganic oxidizable substances in waste water by wet oxidation with a use of a catalyst, which comprises:

oxidizing and/or decomposing the oxidizable substances with an oxygen containing gas in the presence of a catalyst under pressure, wherein the waste water remains in a liquid phase at a oxidizing and/or decomposing the oxidizable substances with an oxygen containing gas in the presence of a catalyst under pressure, wherein the waste water remains in a liquid phase at a temperature of 50 to less than 170° C., wherein the catalyst contains activated carbon and at least one element selected from the group consisting of Pt, Pd, Rh, Ru, Ir and Au, and wherein the catalyst contains pores having a core diameter in a range of 0.1 to 10 μm and a specific pore volume in a range of 0.1 to 0.8 ml/g; and adding a catalyst recovering liquid which contains easily decomposable substances to the catalyst at a temperature in the range from 55° C. to less than 200° C.

14. The method according to claim 13, wherein the amount of the catalyst recovering liquid which is added is controlled so that the easily decomposable substances in the recovering liquid remain in a liquid phase when passed through the catalyst.

15. The method according to claim 13, wherein the amount of the oxygen containing gas is controlled so that the amount of oxygen in the oxygen containing gas relative to the oxygen demand of the protection liquid at maximum catalyst protecting efficiency when the catalyst protection liquid is added is a ratio of 0:1 to 1.3:1.

* * * * *